US010979778B2

(12) United States Patent
Matthews et al.

(10) Patent No.: US 10,979,778 B2
(45) Date of Patent: Apr. 13, 2021

(54) SYSTEMS AND METHODS FOR SELECTING TYPE OF SECONDARY CONTENT TO PRESENT TO A SPECIFIC SUBSET OF VIEWERS OF A MEDIA ASSET

(71) Applicant: Rovi Guides, Inc., San Carlos, CA (US)

(72) Inventors: Sean Matthews, Los Altos, CA (US); Paul T. Stathacopoulos, San Carlos, CA (US); Benjamin H. Maughan, Pleasanton, CA (US)

(73) Assignee: Rovi Guides, Inc., San Jose, CA (US)

( * ) Notice: Subject to any disclaimer, the term of this patent is extended or adjusted under 35 U.S.C. 154(b) by 332 days.

(21) Appl. No.: 15/421,671

(22) Filed: Feb. 1, 2017

(65) Prior Publication Data

US 2018/0220198 A1 Aug. 2, 2018

(51) Int. Cl.
| | |
|---|---|
| *G06Q 30/02* | (2012.01) |
| *H04N 21/81* | (2011.01) |
| *H04N 21/258* | (2011.01) |
| *H04N 21/45* | (2011.01) |
| *H04N 21/442* | (2011.01) |
| *H04N 21/845* | (2011.01) |
| *H04N 21/25* | (2011.01) |
| *H04N 21/466* | (2011.01) |

(Continued)

(52) U.S. Cl.
CPC .......... *H04N 21/812* (2013.01); *H04H 20/10* (2013.01); *H04H 60/33* (2013.01); *H04N 21/252* (2013.01); *H04N 21/25883* (2013.01); *H04N 21/25891* (2013.01); *H04N 21/44222* (2013.01); *H04N 21/4532* (2013.01); *H04N 21/4661* (2013.01); *H04N 21/84* (2013.01); *H04N 21/8456* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |

(Continued)

OTHER PUBLICATIONS

Balachandran et al., Developing a Predictive Model of Quality of Experience for Internet Video, Aug. 2013, ACM SIGCOMM Computer Communication Review, pp. 339-350 (Year: 2013).*

*Primary Examiner* — John Van Bramer
(74) *Attorney, Agent, or Firm* — Haley Guiliano LLP

(57) ABSTRACT

Systems and methods are provided herein for identifying viewers who are engaged in a media asset but unlikely to consume secondary content, and presenting, to the identified viewers, some secondary content designed to incentivize the identified viewers to consume secondary content. These systems and methods determine that a viewer is engaged in a media asset upon determining level of engagement of the viewer in the media asset is greater than a threshold value. These systems and methods determine that the viewer is unlikely to consume secondary content upon determining level of engagement of the viewer in secondary content is less than a threshold value. These systems and methods, upon determining that the viewer is engaged in the media asset but unlikely to consume secondary content, generate for display secondary content related to the media asset during breaks in the media asset.

18 Claims, 8 Drawing Sheets

(51) Int. Cl.
*H04N 21/84* (2011.01)
*H04H 60/33* (2008.01)
*H04H 20/10* (2008.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,797 B2 | 10/2011 | Bentolila et al. |
| 8,046,801 B2 | 10/2011 | Ellis et al. |
| 8,417,096 B2 | 4/2013 | Gharaat et al. |
| 9,465,435 B1 | 10/2016 | Zhang et al. |
| 2002/0174430 A1 | 11/2002 | Ellis et al. |
| 2005/0251827 A1 | 11/2005 | Ellis et al. |
| 2008/0083003 A1 | 4/2008 | Biniak et al. |
| 2008/0152300 A1 | 6/2008 | Knee et al. |
| 2009/0304357 A1* | 12/2009 | Rashkovskiy ....... H04H 20/106 386/248 |
| 2010/0076850 A1 | 3/2010 | Parekh et al. |
| 2010/0153885 A1 | 6/2010 | Yates |
| 2011/0015989 A1 | 1/2011 | Tidwell et al. |
| 2013/0205314 A1* | 8/2013 | Ramaswamy ... H04N 21/44218 725/14 |
| 2014/0150002 A1* | 5/2014 | Hough ............... H04N 21/2668 725/9 |
| 2015/0332314 A1* | 11/2015 | Chakraborty ...... G06Q 30/0242 705/14.45 |
| 2016/0037213 A1* | 2/2016 | Collins ............ H04N 21/44218 725/10 |
| 2016/0117727 A1 | 4/2016 | Campbell et al. |
| 2017/0257669 A1* | 9/2017 | Liu .................... H04N 21/2668 |

* cited by examiner

SYSTEMS AND METHODS FOR SELECTING TYPE OF SECONDARY CONTENT TO PRESENT TO A SPECIFIC SUBSET OF VIEWERS OF A MEDIA ASSET

BACKGROUND

In media systems in the related art, primary content providers may select secondary content to be presented to a viewer based on characteristics associated with the viewer. Primary content providers, such as channels that provide television programming, target secondary content that plays between segments of media assets in a manner that attempts to maximize revenue. For example, primary content providers may target viewers who are engaged in a given media asset for presentation on secondary content. However, primary content providers do not account for a subset of viewers, within the group of viewers that is engaged in the media asset, who skip consuming secondary content. For example, a viewer may skip consuming secondary content being presented on a channel by switching to a different channel for duration of the secondary content. A viewer may skip consuming secondary content by turning off the sound during presentation of the secondary content. As a result, secondary content presented to viewers who are engaged in a media asset may not be optimally monetized.

SUMMARY

Systems and methods are provided herein for identifying viewers who are engaged in a media asset but unlikely to consume secondary content, and presenting to the identified viewers some secondary content designed to engage the identified viewers in consuming secondary content. The identified viewers are presented with secondary content related to the media asset during breaks in the media asset. The identified viewers, because of their interest in the media asset, are incentivized to consume secondary content presented during breaks in the media asset. As a result, the identified viewers are less likely to skip consuming secondary content, leading to improved monetization for content providers.

In some aspects, a media guidance application may determine a first level of engagement of a viewer in a first segment of a media asset. The media guidance application may determine a second level of engagement of the viewer in a second segment of the media asset, where the second segment is subsequent to the first segment and separated from the first segment by a first break in the media asset. The media guidance application may determine that the viewer is engaged in the media asset upon determining that both the first level of engagement and the second level of engagement exceed a threshold engagement level for the media asset. The media guidance application may determine that the viewer has a high propensity to skip consuming secondary content in response to determining that level of engagement of the user in secondary content presented during the first break in the media asset is less than a threshold level of engagement for the secondary content. The media guidance application may, upon determining that the viewer is engaged in the media asset and has a high propensity to skip consuming secondary content, generate for display secondary content related to the media asset during a second break in the media asset, where the second break is subsequent to the second segment.

In some aspects, a media guidance application may determine a first level of engagement of a viewer in a first segment of a media asset. As an illustrative example, the media asset "Game of Thrones" may include four segments (e.g., first segment, second segment, third segment and fourth segment) and three breaks (e.g., first break, second break and third break), where each break is in between and contiguous with two segments. The four segments may be portions of the media asset "Game of Thrones" while the breaks may be composed of secondary content.

The media guidance application may determine, based on a time stamp for a current progress point in the media asset, which segment of the media asset or which break in the media asset the current progress point corresponds to. A time stamp is any unique identifier for the current progress point in the media asset. In some embodiments, the time stamp may be a time code associated with a frame of the media asset. For example, the time code may be in the format (hour:minute:second:frame) where (hour:minute:second) portion indicates an amount of time elapsed from start point of the media asset and (frame) identifies a frame associated with point in time indicated by the (hour:minute:second) portion.

The media guidance application may determine whether a current progress point in the media asset corresponds to the first segment by extracting, from the media asset stream, a time stamp for the current progress point in the media asset. For example, the media guidance application may extract time code (00:01:00:02) for the current progress point in the media asset "Game of Thrones." The media guidance application may access a time stamp data structure associated with the media asset that contains time stamps corresponding to start points and end points for media asset segments and breaks that the media asset is comprised of The data structure may be stored locally in memory, or remotely at a media guidance data source accessible via a communications network. The media guidance application may retrieve, from the time stamp data structure, a time stamp corresponding to start point and a time stamp corresponding to end point of the first segment. For example, the media guidance application may retrieve, from a time stamp data structure associated with the media asset "Game of Thrones," time codes (00:00:00:00) and (00:09:59:29) corresponding to the start point and the end point respectively of the first segment of "Game of Thrones."

The media guidance application may compare the time stamp that indicates the current progress point in the media asset with the time stamp corresponding to the start point and the time stamp corresponding to the end point of the first segment. Based on the comparison, the media guidance application may determine whether the current progress point is within the range defined by the time stamp corresponding to the start point and the time stamp corresponding to the end point of the first segment. Upon determining that the current progress point is within the range, the media guidance application may determine that the current progress point corresponds to the first segment. For example, the media guidance application may determine that the current progress point (00:01:00:02) in "Game of Thrones" corresponds to the first segment of "Game of Thrones" because it is within the range defined by the start time code and the end time code (i.e., (00:00:00:00) and (00:9:59:29) respectively) of the first segment of "Game of Thrones."

The media guidance application may monitor, at the current progress point in the media asset, for indicators of engagement in the current progress point of the media asset. As discussed previously, the media guidance application may determine which segment of the media asset the current progress point in the media asset corresponds to. The media guidance application may further use this information to determine which segment of the media asset the indicators of engagement in the current progress point of the media asset correspond to. In alternative embodiments, the media guidance application may determine, based on a time stamp associated with the indicators of engagement monitored, which segment of the media asset indicators of engagement monitored correspond to.

Indicators of engagement in content can be but are not limited to a representation of actions performed on the content (e.g., volume changes, playback speed changes, channel switch and other suitable actions), viewer's activity during presentation of the content (e.g., viewer's social media activity, viewers movements and gestures and other suitable activity) and viewer's physiological and emotional response (e.g., viewer's heart rate, facial expressions and other responses). The media guidance application may access a variety of monitoring devices (e.g., image and video capture devices, motion, physiological, and neurological sensors and other suitable monitoring devices) to monitor for the indicators of engagement.

In some embodiments, the media guidance application may compute a first level of engagement of the viewer in the first segment of the media asset based on at least one of the indicators of engagement in the first segment of the media asset. In some embodiments, the media guidance application may determine the first level of engagement to be a weighted sum of values corresponding to indicators of engagement in the first segment of the media asset. As an illustrative example, the media guidance application may determine that indicators of engagement in the first segment of "Game of Thrones" are facial expressions, viewer motion and amount of content fast-forwarded through. The media guidance application may compute the level of engagement using the formula (facial expressions value+viewer motion value+ amount of content fast-forwarded through value). The media guidance application may determine that values corresponding to the indicators of engagement in the first segment of "Game of Thrones" are 5, −5, and 11 respectively and accordingly, the media guidance application may compute the level of engagement to be 11.

In some embodiments, the media guidance application may determine the first level of engagement based on media consumption behavior of the viewer. The media guidance application may access a data structure associated with a profile of the viewer to determine the media consumption behavior of the viewer. The media guidance application may identify the data structure associated with the profile of the viewer based on a unique credential associated with the viewer. The media guidance application may receive a unique credential associated with the viewer (e.g., log-in information such as a string of characters or bio-metric data such as finger print, retina scan, voice recognition or another suitable bio-metric data) from the viewer. Alternatively, the media guidance application may receive an identifier associated with user equipment (e.g., a device identifier (ID), Internet protocol (IP) address and other suitable identifiers) on which the media asset is being viewed. The media guidance application may determine the identity of the viewer by retrieving, based on the identifier associated with the user equipment, a unique credential corresponding to the user equipment. For example, the media guidance application may determine, based on device ID of a user equipment, a log-in ID associated with a viewer who uses the user equipment. The media guidance application may then access a data structure (e.g., viewer's profile) associated with the unique credential. In some embodiments, the media guidance application may receive other data (e.g., cookies) associated with a user equipment and determine an identity of a viewer using the user equipment based on the other data. Media consumption behavior of the viewer may include but is not limited to a summary of the viewer's traits when viewing media assets. For example, media consumption behavior of the viewer may indicate the amount of content the viewer typically watches uninterrupted, the viewer's gestures of interest, the viewer's heart rate patterns, the viewer's typical level of activity while viewing media assets and other suitable traits.

In some embodiments, the media guidance application may compute the first level of engagement based on the media consumption behavior of the viewer. For example, the media guidance application may adjust a weight assigned to an indicator of engagement used in the computation of the first level of engagement based on the media consumption behavior of the viewer. For example, the viewer may frequently be running on a treadmill while viewing media assets and consequently, the media consumption behavior may indicate that the viewer typically has a high degree of motion while viewing media assets. Because high degree of motion is not necessarily equivalent to the viewer expressing disinterest in media assets, the media guidance application may decrease the weight corresponding to the viewer motion indicator. For example, the media guidance application may adjust the formula for computing the first level of engagement from (facial expressions value+viewer motion value+ amount of content fast-forwarded through value) to (facial expressions value+0.2×viewer motion value+amount of content fast-forwarded through value). Following from the previous example, the media guidance application may compute the first level of engagement to be 15.

In some embodiments, the media guidance application may receive an average audience engagement level corresponding to an average of levels of engagement of other viewers in the media asset. The media guidance application may compute the first level of engagement based on the average audience engagement level. In some embodiments, the media guidance application may compute the first level of engagement in the first segment of the media asset using a default formula for all media assets (e.g., (facial expressions value+viewer motion value+amount of content fast-forwarded through value)). In some embodiments, the scale used for representing levels of engagement in media assets may be a standard scale. In some cases, level of engagement computed using a default formula may not accurately represent the actual level of engagement in a segment of a media asset on a standardized scale.

As an illustrative example, the media asset may be a workout video and consequently, high level of viewer motion while viewing the video does not necessarily indicate disinterest in the video. The media guidance application may determine, using the default formula, the first level of engagement of the viewer in the workout video to be 4. On a standardized scale of 1 to 10, with 1 being the lowest level of engagement, this may be a low level of engagement. However, the media guidance application may determine the average audience engagement score, calculated using the default formula, for viewers engaged in the workout video to be 3. In order to accurately reflect the level of engagement of the viewer on the standardized scale, the media guidance application may adjust the first level of engagement based on the average audience engagement score. As an illustrative example, the media guidance application may use the formula [(average audience engagement score−first level of engagement)*4+first level of engagement computed using the default formula] to compute the first level of engagement. In this example, the media guidance application may determine, based on the average audience engagement score, the first level of engagement to be 8.

The media guidance application may determine a second level of engagement of the viewer in secondary content presented during a first break in the media asset, where the first break is subsequent to the first segment. Manners in which the media guidance application may perform this determination discussed previously are applicable here. For example, the media guidance application may determine, based on start time code and end time code (e.g., (00:10:00:00) and (00:11:59:29) respectively) of the first break in "Game of Thrones," that time code (00:11:00:02) for the current progress point in "Game of Thrones" corresponds to the first break in "Game of Thrones." The media guidance application may determine that the level of engagement of the viewer in the secondary content (e.g., an advertisement for a waffle maker) presented during the first break in "Game of Thrones" is 3.

The media guidance application may determine a third level of engagement of the viewer in a second segment of the media asset, where the second segment is subsequent to the first break. Manners in which the media guidance application may perform this determination discussed previously are applicable here. For example, the media guidance application may determine, based on start time code and end time code (e.g., (00:12:00:00) and (00:19:59:29) respectively) of the second segment of "Game of Thrones," that time code (00:13:00:02) for the current progress point in "Game of Thrones" corresponds to the second segment in "Game of Thrones." The media guidance application may determine that the level of engagement of the viewer in the second segment of "Game of Thrones" is 9. In some embodiments, the media guidance application may compute the third level of engagement based on the media consumption behavior of the viewer. In some embodiments, the media guidance application may compute the third level of engagement based on the average audience engagement score. Manners in which the media guidance application may perform these computations discussed previously are applicable here.

The media guidance application may determine whether both the first level of engagement and the third level of engagement exceed a threshold level of engagement in the media asset. The media guidance application may access a data structure associated with a media guidance data source to retrieve the threshold level of engagement in the media asset. Alternatively, the media guidance application may extract the threshold level of engagement in the media asset from metadata associated with the media asset. In some embodiments, the media guidance application may access a data structure associated with the media asset (e.g., threshold values data structure) to retrieve the threshold level of engagement in the media asset. In some embodiments, the threshold level of engagement in the media asset may be a pre-assigned default value (e.g., 6). In alternative embodiments, the threshold level of engagement in the media asset may be a dynamic value determined based on levels of engagement of viewers in the media asset (e.g., average of levels of engagement of viewers+some factor). The media guidance application may, in response to determining that both the first level of engagement and the third level of engagement exceed the threshold level of engagement in the media asset, determine that the viewer is engaged in the media asset.

As an illustrative example, the media guidance application may determine the threshold level of engagement in "Game of Thrones" is 6. In this case, the media guidance application may determine, because both the first level of engagement (i.e., 11) and the third level of engagement (i.e., 9) exceed the threshold level of engagement (i.e., 6), the viewer is engaged in "Game of Thrones." In some embodiments, the media guidance application may assign a value corresponding to an "engaged in the media asset" flag associated with the viewer to "true" upon determining that the viewer is engaged in the media asset.

The media guidance application may determine whether the second level of engagement exceeds a threshold level of engagement for the secondary content. The media guidance application may, in response to determining that the second level of engagement does not exceed the threshold level of engagement for the secondary content, determine that the viewer is not engaged in the secondary content. For example, the media guidance application may determine the threshold level of engagement in the secondary content (i.e., the advertisement for a waffle maker) presented during the first break in "Game of Thrones" is 5. In this case, the media guidance application may determine, because the second level of engagement (i.e., 3) does not exceed the threshold level of engagement for the secondary content (i.e., 5), the viewer is not engaged in the secondary content. In some embodiments, the media guidance application may assign a value corresponding to an "engaged in secondary content" flag associated with the viewer to "false" upon determining that the viewer is not engaged in the secondary content.

In some embodiments, the threshold level of engagement for the secondary content may be a function of the first level of engagement of the viewer in the first segment of a media asset. For example, the media guidance application may determine that the threshold level of engagement for the secondary content has to be increased linearly as a function of the first level of engagement. As an illustrative example, the media guidance application may compute the threshold level of engagement for the secondary content using the formula {some constant+(0.25*the first level of engagement)}.

The media guidance application may, in response to determining that the viewer is engaged in the media asset and the viewer is not engaged in the secondary content, generate for display secondary content related to the media asset during a second break in the media asset. Secondary content related to the media asset may be promotional content for the media asset (e.g., teaser trailer about what will be presented next in the media asset and other content that incentivizes the viewer to continue watching the media asset from the end point of the second break). For example, the media guidance application may determine that time codes (00:20:00:00) and (00:21:59:29) correspond to start point and end point of second break in "Game of Thrones." Upon determining that the current progress point in "Game of Thrones" (e.g., (00:20:00:00)) corresponds to the second break in "Game of Thrones," the media guidance application may present a trailer of what will be presented in "Game of Thrones" right after the end of the second break.

In some embodiments, the media guidance application may access a data structure associated with a profile of the viewer to determine indicators of preferences of the viewer. Examples of indicators of preferences of the viewer include but are not limited to genre (e.g., drama, comedy, romance), actors, type of characters (e.g., strong female lead, intelligent mastermind, jovial personality) and setting (e.g., manors, oceans, forests). The media guidance application may determine, based on the indicators of preferences of the viewer, an aspect of the media asset that is of most interest to the viewer. The aspect of the media asset that is of most interest to the viewer may be one of a character, a plotline, a setting and an event. For example, the media guidance application may determine, from the indicators of preferences of the viewer, that the viewer enjoys watching content related to strong female leads and content related to the actress "Emilia Clarke." Based on this, the media guidance application may determine that the aspect of "Game of Thrones" that that is of most interest to the viewer is the strong female lead "Daenerys Targaryen," who is portrayed by the actress "Emilia Clarke."

The media guidance application may determine a segment of the media asset to be presented subsequent to the second break that corresponds to the aspect of the media asset that is of most interest to the viewer. The media guidance application may include the segment in the secondary content related to the media asset. For example, upon identifying that the character "Daenerys Targaryen" is of most interest to the viewer, the media guidance application may identify a frame in "Game of Thrones" associated with the character "Daenerys Targaryen" that is to be presented subsequent to the second break. For example, the media guidance application may determine that start time code and end time code for the second break is (00:20:00:00) and (00:21:59:29) respectively. The media guidance application may identify the required frame by querying a data structure associated with "Game of Thrones" for a frame that has a time code later than (00:21:59:29) and is associated with metadata "Daenerys Targaryen." The media guidance application may perform the query, using database management languages such as SQL, JAPQL, CODASYL or another suitable language. The media guidance application may include the frame associated with "Daenerys Targaryen" in a teaser trailer of what will be presented in "Game of Thrones" after the second break.

In some embodiments, the media guidance application may include, in the secondary content related to the media asset, an indication that additional secondary content related to the media asset will be presented during at least one of the second break or another break in the media asset subsequent to the second break. The media guidance application may generate for display, during at least one of the second break or another break in the media asset subsequent to the second break, the additional secondary content related to the media asset. For example, the media guidance application may display, in the secondary content related to "Game of Thrones," a message such as "Do not miss a preview of what happens to 'Daenerys Targaryen.' Preview will be presented during the break." The media guidance application may then present a frame associated with the character "Daenerys Targaryen" at a later point in the second break. Informing the viewer that that additional secondary content related to the media asset will be presented during breaks makes the viewer less likely to skip watching secondary content presented during breaks for fear of missing the additional secondary content.

In some embodiments, the additional secondary content presented during at least one of the second break or another break in the media asset subsequent to the second break may not be a segment of the media asset. Examples of additional secondary content that is not a segment of the media asset include but are not limited to interviews of the cast, directors and other personnel associated with the media asset, events associated with the media asset (e.g., viewing party with the cast, upcoming premier of the media asset), and behind the scenes footage. In some embodiments, the media guidance application may retrieve, from a data structure associated with secondary content, secondary content candidates that are related to the media asset that are not segments of the media asset. For example, the media guidance application may retrieve a list of secondary content identifiers corresponding to secondary content comprising interviews of cast members of "Game of Thrones."

The media guidance application may retrieve, from a data structure associated with a profile of the viewer, an indicator of a preference of the viewer. Examples of an indicator of a preference of the viewer include but are not limited to genre, actors, type of characters and setting. For example, the media guidance application may determine that an indicator of a preference of the viewer is the actress "Emilia Clarke" who plays a major character in "Game of Thrones." The media guidance application may determine the additional secondary content by identifying a secondary content candidate of the secondary content candidates that is associated with the indicator of the preference of the viewer. For example, the media guidance application may identify, from a list of secondary content identifiers for secondary content related to the media asset, an identifier corresponding to a secondary content comprising an interview of actress "Emilia Clarke." The media guidance application may then retrieve the secondary content comprising an interview of actress "Emilia Clarke" and present it during the second break or another break in "Game of Thrones" subsequent to the second break.

In some embodiments, the secondary content related to the media asset may be primary secondary content and the threshold level of engagement in the media asset may be a first threshold level of engagement in the media asset. The media guidance application may retrieve, from a first data structure associated with a profile of the viewer, indicators of preferences of the viewer. For example, the media guidance application may retrieve actress "Emilia Clarke," strong female lead and fantasy genre as indicators of preference of the viewer. The media guidance application may retrieve, from a second data structure containing secondary content, additional secondary content that is associated with at least one of the indicators of preferences of the viewer and a second threshold level of engagement in the media asset. The media guidance application may generate for display, during the second break in the media asset, the additional secondary content subsequent to display of the primary secondary content related to the media asset.

The media guidance application may determine that there is a first threshold level of engagement in the media asset to broadly categorize viewers into one of two groups: engaged in the media asset and not engaged in the media asset. The media guidance application may determine there is a second threshold level of engagement in media asset to further sub-categorize the group that is engaged in media asset. For example, the media guidance application may determine, based on the second threshold level of engagement in the media asset, whether a viewer is highly engaged in the media asset or not.

As an illustrative example, the media guidance application may determine that the second threshold level of engagement in "Game of Thrones" to be 8. Upon determining that level of engagement of a viewer for both a first segment and a second segment of "Game of Thrones" exceed 8, the media guidance application may determine that the viewer is highly engaged in the media asset. The media guidance application may determine that secondary content promoting a fantasy genre convention is associated with the second threshold level of engagement in "Game of Thrones". For example, the media guidance application may determine, based on metadata associated with the promotion for a fantasy genre convention, that the promotion is intended only for viewers who are highly engaged in "Game of Thrones" (i.e., engagement levels 8 or higher). The media guidance application may determine that secondary content promoting a fantasy themed theme park is not associated with the second threshold level of engagement in "Game of Thrones". For example, the media guidance application may determine the promotion for fantasy themed theme park is targeted for viewers who are moderately engaged in "Game of Thrones" (e.g., engagement levels ranging from 6-7) and consequently, not associated with the second threshold level of engagement in "Game of Thrones". The media guidance application may determine, based on the first engagement level of 11 and the third engagement level of 9, that the viewer is highly engaged in "Game of Thrones". The media guidance application may then retrieve secondary content promoting a fantasy genre convention because it is associated with the second threshold level of engagement in "Game of Thrones" and fantasy genre (i.e., an indicator of preferences of the viewer). The media guidance application may then generate for display, during the second break and subsequent to display of a teaser trailer for "Game of Thrones," the secondary content promoting a fantasy genre convention.

In some embodiments, the secondary content may be primary secondary content and the media guidance application may generate for display, during the second break in the media asset, additional secondary content subsequent to display of the primary secondary content related to the media asset. For example, the media guidance application may generate for display, during the second break in "Game of Thrones," a teaser trailer of "Game of Thrones" followed by a promotion for a fantasy genre convention. The media guidance application may determine a fourth level of engagement of the viewer in the additional secondary content. Manners in which the media guidance application may perform this determination discussed previously are applicable here. For example, the media guidance application may determine level of engagement of the viewer in the promotion for a fantasy genre convention to be 7. The media guidance application may determine a fifth level of engagement of the viewer in a third segment of the media asset, where the third segment is subsequent to the second break. For example, the media guidance application may determine that time codes (00:22:00:00) and (00:29:59:29) correspond to start point and end point of a third segment in "Game of Thrones." The media guidance application may determine, in manners described previously, that level of engagement of the viewer in the third segment of "Game of Thrones" is 10.

The media guidance application may determine whether the fifth level of engagement exceeds the threshold level of engagement in the media asset. The media guidance application may, in response to determining that the fifth level of engagement exceeds the threshold level of engagement in the media asset, determine that the viewer remains engaged in the media asset. For example, the media guidance application may determine, because the level of engagement of the viewer in the third segment of "Game of Thrones" (i.e., 10) exceeds the threshold level of engagement in the media asset (i.e., 6), the viewer remains engaged in "Game of Thrones."

The media guidance application may determine whether the fourth level of engagement exceeds a threshold level of engagement for the additional secondary content. The media guidance application may, in response to determining that the fourth level of engagement exceeds the threshold level of engagement for the additional secondary content, determine that the viewer is engaged in the additional secondary content. For example, the media guidance application may determine, because the level of engagement of the viewer in the promotion for a fantasy genre convention (i.e., 7) exceeds the threshold level of engagement for the promotion for a fantasy genre convention (e.g., 5), the viewer is engaged in the promotion for a fantasy genre convention.

The media guidance application may, in response to determining that the viewer remains engaged in the media asset and the viewer is engaged in the additional secondary content, refrain from generating for display the additional secondary content related to the media asset during a third break, where the third break is subsequent to the third segment. For example, the media guidance application may determine that time codes (00:30:00:00) and (00:31:59:29) correspond to start point and end point respectively of a third break in "Game of Thrones." The media guidance application may display secondary content promoting consumer goods during the third break.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The described systems and methods identify viewers who are engaged in a media asset but unlikely to consume secondary content, and present to the identified viewers some secondary content designed to engage the identified viewers in consuming secondary content. The identified viewers are presented with secondary content related to the media asset during breaks in the media asset. The identified viewers, because of their interest in the media asset, are incentivized to consume secondary content presented during breaks in the media asset. As a result, the identified viewers are less likely to skip consuming secondary content, leading to improved monetization for content providers.

As referred to herein, a segment of a media asset means any portion of the media asset that is not an entirety of the media asset. As referred to herein, a segment of a media asset does not include any content besides the media asset content. For example, for the case when the media asset is a forty minute episode of "Game of Thrones," a segment of "Game of Thrones" may be the first fifteen minutes of the episode of "Game of Thrones." For the case when the media asset is a forty minute episode of "Game of Thrones," where content corresponding to minutes fifteen through twenty is secondary content, a segment of "Game of Thrones" may be a portion of content corresponding to minutes zero through fifteen or content corresponding to minutes twenty through forty but not content corresponding to minutes fifteen through twenty. For the case where the media asset is the entire series of "Game of Thrones," comprising of multiple episodes of "Game of Thrones," a segment of "Game of Thrones" may be a given episode of "Game of Thrones."

As referred to herein, secondary content is any content that is provided to a user by a source of the media asset during breaks in playback of the media asset. Secondary content may include content relating to products or services, promotional content, and/or content relating to the media asset that is not a segment of the media asset itself (e.g., a trailer for a next episode of "Game of Thrones"). As referred to herein, secondary content not related to the media asset is any content that does not promote or otherwise describe the media asset itself.

Figure 1:
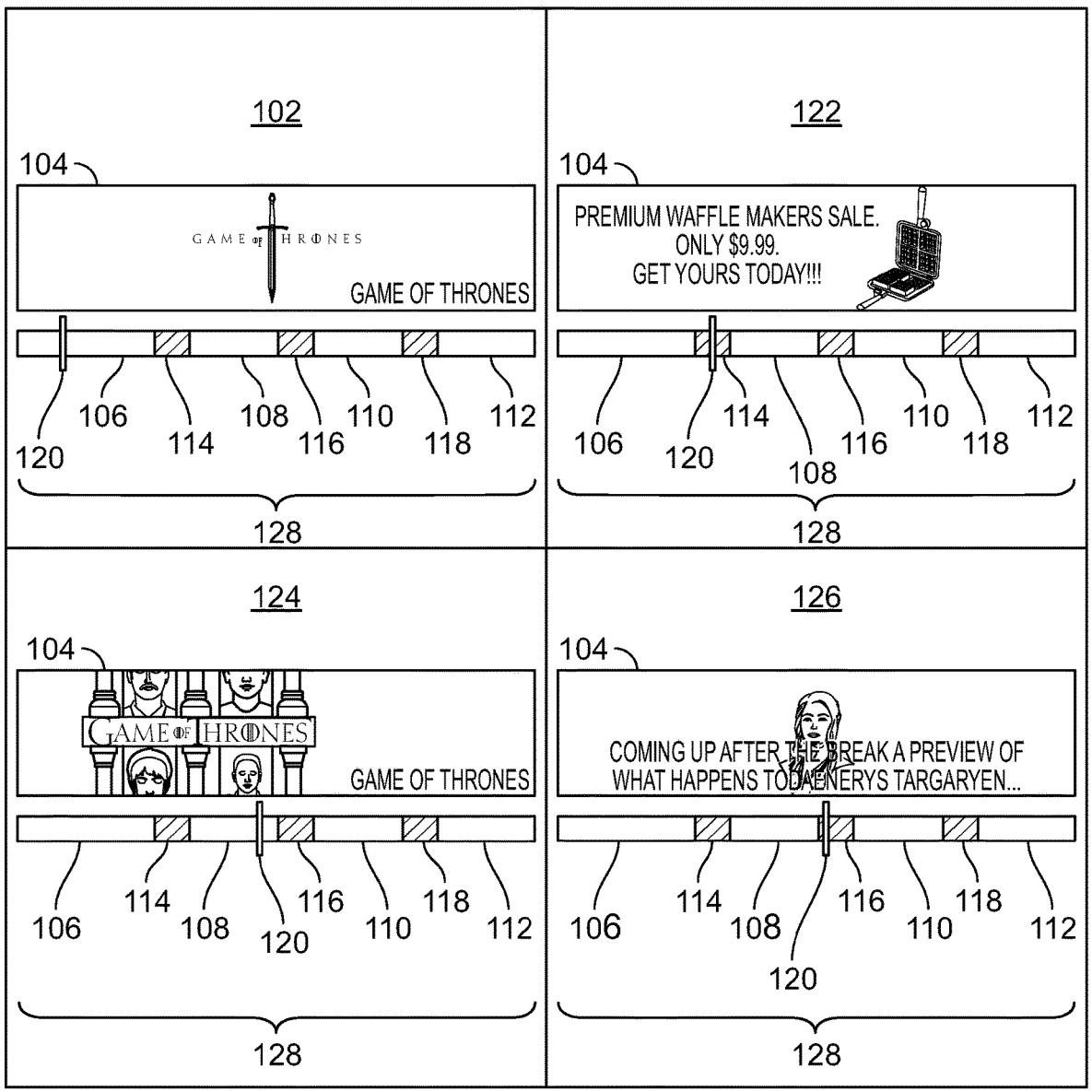
FIG. 1 depicts an illustrative display that the media guidance application may generate for display during presentation of segments of a media asset and breaks in the media asset, in accordance with some embodiments of the disclosure.

FIG. 1 depicts an illustrative display that the media guidance application may generate for display during presentation of segments of a media asset and breaks in the media asset, in accordance with some embodiments of the disclosure. FIG. 1 depicts an illustrative display 100, which may be presented by control circuitry that executes a media guidance application on any user equipment. The functionality of user equipment, control circuitry, and the media guidance application is described in further detail below with respect to FIGS. 2-5. Control circuitry may cause display 100 to be presented using the one or more of the processes described in FIGS. 6-8.

The media guidance application may generate for display a variety of displays, such as display 102, display 122, display 124 and display 126, on display 100. Display 102 is an illustrative example of display that the media guidance application may generate for display when current progress point in the media asset corresponds to a first segment in the media asset. The media guidance application may generate for display media asset 104 that is composed of media asset segments and breaks. As an illustrative example, media asset 104 may be Game of Thrones, which is a fantasy drama television series set in multiple fictional continents that involves several plot lines and a large ensemble cast. The media guidance application may generate for display progress bar 128 that includes media segment indicators (e.g., media asset segment 106, media asset segment 108, media asset segment 110 and media asset segment 112) and break indicators (e.g., break 114, break 116, and break 118). The media guidance application may also generate for display current progress point indicator 120 that corresponds to a viewer's current progress point in media asset 104.

Display 122 is an illustrative example of display that the media guidance application may generate for display when current progress point in the media asset corresponds to a first break in the media asset. Display 124 is an illustrative example of display that the media guidance application may generate for display when current progress point in the media asset corresponds to a second segment in the media asset. Display 126 is an illustrative example of display that the media guidance application may generate for display when current progress point in the media asset corresponds to a second break in the media asset.

In some aspects, a media guidance application may determine a first level of engagement of a viewer in a first segment (e.g., media asset segment 106) of media asset (e.g., media asset 104). The term "level of engagement," as used herein, is defined to mean a qualitative or quantitative indicator of a viewer's interest in a piece of content. For example, level of engagement may be fuzzy logic variables such as "highly not engaged," "moderately engaged" and "highly engaged." The level of engagement may be a numerical value (e.g., 5) on a predefined scale (e.g., scale ranging from 0 to 10 where 0 corresponds to no engagement and 10 corresponds to maximum engagement).

The media guidance application, when determining a level of engagement, may determine which segment or which break in a media asset the determined level of engagement corresponds to. The media guidance application may use a time stamp for a current progress point and time stamps defining boundaries of a segment to determine whether the determined level of engagement corresponds to the segment. A time stamp is any unique identifier for the current progress point in the media asset. In some embodiments, the time stamp may be a time code associated with a frame of the media asset. For example, the time code may be in the format (hour:minute:second:frame) where (hour:minute:second) portion indicates an amount of time elapsed from start point of media asset 104 and (frame) identifies a frame associated with point in time indicated by the (hour:minute:second) portion.

As an illustrative example, the media guidance application may determine, based on a time stamp corresponding to current progress point indicator 120 in media asset 104, which segment of media asset 104 (e.g., media asset segment 106, media asset segment 108, media asset segment 110 and media asset segment 112) or which break in media asset 104 (e.g., break 114, break 116, and break 118) current progress point indicator 120 corresponds to. The media guidance application may determine whether current progress point indicator 120 in media asset 104 corresponds to media asset segment 106 by extracting, from media asset stream, a time stamp corresponding to current progress point indicator 120 in the media asset. For example, the media guidance application may extract time code (00:01:00:02) for current progress point indicator 120 in media asset 104. The media guidance application may access a time stamp data structure associated with media asset 104. The time stamp data structure may contain time stamps corresponding to start points and end points of media asset segments and time stamps corresponding to start points and end points of breaks in the media asset. For example, the time stamp data structure may contain time stamps corresponding to start point and end point of media asset segment 106, media asset segment 108, media asset segment 110, media asset segment 112, break 114, break 116 and break 118. The data structure may be stored locally in memory, or remotely at a media guidance data source accessible via a communications network. The media guidance application may retrieve, from the time stamp data structure, a time stamp corresponding to start point and a time stamp corresponding to end point of media asset segment 106. For example, the media guidance application may retrieve, from a time stamp data structure associated with media asset 104, time codes (00:00:00:00) and (00:09:59:29) corresponding to the start point and the end point respectively of media asset segment 106 of media asset 104.

The media guidance application may compare the time stamp that corresponds to current progress point indicator 120 in media asset 104 with the time stamp corresponding to the start point and the time stamp corresponding to the end point of media asset segment 106. Based on the comparison, the media guidance application may determine whether the current progress point indicator 120 is within the range defined by the time stamp corresponding to the start point and the time stamp corresponding to the end point of media asset segment 106. Upon determining that the time stamp corresponding to current progress point indicator 120 is within the range, the media guidance application may determine that current progress point indicator 120 corresponds to media asset segment 106. For example, the media guidance application may determine that time code corresponding to current progress point indicator 120 is (00:01:00:02). The media guidance application may determine, because (00:01:00:02) is within the range defined by the start time code and the end time code (i.e., (00:00:00:00) and (00:9:59:29) respectively) of media asset segment 106, current progress point indicator 120 corresponds to media asset segment 106 of media asset 104. In this case, the media guidance application may determine that level of engagement determined at current progress point indicator 120 corresponds to media asset segment 106.

In some embodiments, The media guidance application may use indicators of engagement to determine the level of engagement. Indicators of engagement in content can be but are not limited to a representation of actions performed on the content (e.g., volume changes, playback speed changes, channel switch and other suitable actions), viewer's activity during presentation of the content (e.g., viewer's social media activity, viewers movements and gestures and other suitable activity) and viewer's physiological and emotional response (e.g., viewer's heart rate, facial expressions and other responses). The media guidance application may access a variety of monitoring devices (e.g., image and video capture devices, motion, physiological, and neurological sensors and other suitable monitoring devices) to monitor for the indicators of engagement.

The media guidance application may monitor, at the progress point in media asset 104 indicated by current progress point indicator 120, for indicators of engagement in the current progress point of media asset 104. As discussed previously, the media guidance application may determine which segment of media asset 104 (e.g., media asset segment 106, media asset segment 108, media asset segment 110 and media asset segment 112) current progress point indicator 120 corresponds to. The media guidance application may further use this information to determine which segment of media asset 104 the indicators of engagement in the current progress point of media asset 104 correspond to.

In alternative embodiments, the media guidance application may determine which segment of media asset 104 indicators of engagement monitored correspond to based on a time stamp associated with the indicators of engagement monitored.

In some embodiments, the media guidance application may compute first level of engagement of the viewer in media asset segment 106 of media asset 104 based on at least one of the indicators of engagement in media asset segment 106. In some embodiments, the media guidance application may determine the first level of engagement to be a weighted sum of values corresponding to indicators of engagement in media asset segment 106. As an illustrative example, the media guidance application may receive facial expressions, viewer motion and amount of content fast-forwarded through as indicators of engagement for media asset segment 106. The media guidance application may use a variety of data processing techniques to convert each indicator of engagement received into a format that can logically be combined with the other indicator of engagement received. For example, the media guidance application may access a look-up table to convert qualitative indicators into a numerical value.

As an illustrative example, the media guidance application may determine that facial expression for a segment of a media asset currently being consumed is smile. The media guidance application may determine that the segment of the media asset currently being consumed is comedy. The media guidance application may access a look-up table containing numerical values corresponding to different content characteristic and facial expression combinations to determine a numerical value for the smile-comedy combination. The look-up table may contain values on a scale of −15 to +15 where a higher value corresponds to a higher level of engagement. For example, in the look-up table, a smile-comedy combination may have a value of 5 while a frown-comedy combination may have a value of −10.

As another illustrative example, the media guidance application may determine that amount of content fast-forwarded through is 5% of total content consumed. The media guidance application may access a look-up table that defines a number, on a scale of −15 to +15, that a given amount of content fast-forwarded through corresponds to. For example, 5% of total content consumed being fast-forwarded through may correspond to a value of 11 in the look-up table. In some embodiments, the media guidance application may retrieve a formula for converting the amount of content fast-forwarded through into a number on a scale of −15 to +15. The media guidance application may similarly determine a number corresponding to viewer motion. The media guidance application may, upon converting the indicators of engagement into the same format, standardize each indicator so that they can be combined on the same scale.

The media guidance application may access a data structure (e.g., parameters and formulae for level of engagement computation data structure) to determine how indicators of engagement monitored should be manipulated to extrapolate a level of engagement. The media guidance application may determine that the level of engagement is to be computed by combining standardized indicators of engagement. As an illustrative example, the media guidance application may compute the level of engagement using the formula (facial expressions value+viewer motion value+amount of content fast-forwarded through value). The media guidance application may determine, in manners described previously, that values corresponding to the indicators of engagement in media asset segment 106 are 5, −5, and 11 respectively. Accordingly, the media guidance application may compute the level of engagement to be 11.

In some embodiments, the media guidance application may determine the first level of engagement based on media consumption behavior of the viewer. The media guidance application may access a data structure associated with a profile of the viewer to determine the media consumption behavior of the viewer. The media guidance application may identify the data structure associated with the profile of the viewer based on a unique credential associated with the viewer. The media guidance application may receive the unique credential associated with the viewer (e.g., log-in information such as a string of characters or bio-metric data such as finger print, retina scan, voice recognition or another suitable bio-metric data) from the viewer. Alternatively, the media guidance application may receive an identifier associated with user equipment (e.g., a device ID, IP address and other suitable identifiers) on which the media asset is being viewed. The media guidance application may determine the identity of the viewer by retrieving, based on the identifier associated with the user equipment, a unique credential corresponding to the user equipment. For example, the media guidance application may determine, based on device ID of a user equipment, a log-in ID associated with a viewer who uses the user equipment. The media guidance application may then access a data structure (e.g., viewer's profile) associated with the unique credential. In some embodiments, the media guidance application may receive other data (e.g., cookies) associated with a user equipment and determine an identity of a viewer using the user equipment based on the other data. Media consumption behavior of the viewer may include but is not limited to a summary of the viewer's traits when viewing media assets. For example, media consumption behavior of the viewer may indicate the amount of content the viewer typically watches uninterrupted, the viewer's gestures of interest, the viewer's heart rate patterns, the viewer's typical level of activity while viewing media assets and other suitable traits.

In some embodiments, the media guidance application may compute the first level of engagement based on the media consumption behavior of the viewer. In some embodiments, the media guidance application may compute the first level of engagement based on the media consumption behavior of the viewer associated with consumption of media assets that are similar to the media asset. Media assets that are similar to the media asset may share any of the same genre, actors, story line, settings and other suitable characteristics with the media asset. For example, the media guidance application may adjust weight assigned to an indicator of engagement used in the computation of the first level of engagement based on the media consumption behavior of the viewer. For example, the viewer may frequently be running on a treadmill while viewing media assets and consequently, the media consumption behavior may indicate that the viewer typically has a high degree of motion while viewing media assets. Because high degree of motion is not necessarily equivalent to the viewer expressing disinterest in media assets, the media guidance application may decrease the weight corresponding to the viewer motion indicator. The media guidance application may access a look-up table to determine, based on the viewer's typical degree of motion level, a weight that should be used for viewer motion value. For example, the media guidance application may determine, from the look-up table, that for average degree of motion, the weight for viewer motion value is 1 and for high degree of motion, the weight for viewer motion value is 0.2. Following from the previous example, the media guidance application may adjust the formula for computing the first level of engagement from (facial expressions value+viewer motion value+amount of content fast-forwarded through value) to (facial expressions value+0.2×viewer motion value+amount of content fast-forwarded through value). Accordingly, the media guidance application may compute the first level of engagement to be 15.

In some embodiments, the media guidance application may receive an average audience engagement level corresponding to an average of levels of engagement of other viewers in the media asset. The media guidance application may receive indicators of engagement in the media asset, collected over some specific period of time, associated with each viewer of a sample group of viewers. The sample group of viewers may be all viewers of the media asset or a sub-set of all viewers of the media asset (e.g., viewers of the media asset who have viewing preferences similar to that of the viewer, viewers of the media asset who are associated with a social media account of the viewer). The media guidance application may compute, based on the received indicators of engagement, a level of engagement in the media asset corresponding to each viewer of the sample group of viewers. The media guidance application may determine an average audience engagement level by computing a weighted average of level of engagement in the media asset corresponding to each viewer of the sample group of viewers. Alternatively, the average audience engagement level in the media asset may be included in metadata associated with the media asset and the media guidance application may extract the average audience engagement level in manners described previously.

The media guidance application may compute the first level of engagement based on the average audience engagement level. In some embodiments, the media guidance application may compute the first level of engagement in media asset segment 106 using a default formula for all media assets (e.g., (facial expressions value+viewer motion value+amount of content fast-forwarded through value)). In some embodiments, the scale used for representing levels of engagement in media assets may be a standard scale. In some cases, level of engagement computed using a default formula may not accurately represent the actual level of engagement in media asset segment 106 of media asset 104 on a standardized scale.

As an illustrative example, media asset 104 may be a workout video and consequently, high level of viewer motion while viewing the video does not necessarily indicate disinterest in the video. The media guidance application may determine, using the default formula, the first level of engagement of the viewer in media asset 4 (i.e., the workout video) to be 4. On a standardized scale of 1 to 10, with 1 being the lowest level of engagement, this may be a low level of engagement. However, the media guidance application may determine the average audience engagement score, calculated using the default formula, for viewers engaged in the workout video to be 3. In order to accurately reflect the level of engagement of the viewer on the standardized scale, the media guidance application may adjust the first level of engagement based on the average audience engagement score. In some embodiments, the media guidance application may access a data structure (e.g., parameters and formulae for level of engagement computation data structure) to determine a function for computing level of engagement based on the average audience engagement level. As an illustrative example, the media guidance application may use the formula [(average audience engagement score−first level of engagement)*4+first level of engagement computed using the default formula] to compute the first level of engagement. In this example, the media guidance application may determine, based on the average audience engagement score, the first level of engagement media asset segment 106 to be 8.

In some embodiments, the first level of engagement may be a fuzzy logic value (e.g., "engaged," "neutral," "not engaged"). In some embodiments, the media guidance application may determine the first level of engagement of a viewer based on the viewer's behavior compared to subset of other viewers. For example, the media guidance application may retrieve an average audience engagement level associated with subset of other viewers (e.g., viewers having a demographic profile similar to the user). For example, the media guidance application may determine that the average audience engagement level is 7. The media guidance application may compare an engagement level of the viewer with the average audience engagement level to determine the first level of engagement. For example, for the case that engagement level of the viewer is 5, the media guidance application may determine that the first level of engagement is "not engaged." For the case that engagement level of the viewer is 8, the media guidance application may determine that the first level of engagement is "engaged." For the case that engagement level of the viewer is 7, the media guidance application may determine that the first level of engagement is "engaged." In some embodiments, the media guidance application may similarly determine the first level of engagement of a viewer based on the viewer's behavior compared to subset of other viewers viewing similar content.

The media guidance application may determine a second level of engagement of the viewer in secondary content presented during break 114 in media asset 104, where the break 114 is subsequent to media asset segment 106. Manners in which the media guidance application may perform this determination discussed previously are applicable here. For example, the media guidance application may determine, based on start time code and end time code (e.g., (00:10:00:00) and (00:11:59:29) respectively) of break 114 in media asset 104, that time code (00:11:00:02) corresponding to current progress point indicator 120 corresponds to the break 114 in media asset 104. The media guidance application may determine, in manners described previously, that the level of engagement of the viewer in the secondary content (e.g., an advertisement for a waffle maker) presented during break 114 in media asset 104 is 3.

The media guidance application may determine a third level of engagement of the viewer in media asset segment 108 of media asset 104, where media asset segment 108 is subsequent to break 114. Manners in which the media guidance application may perform this determination discussed previously are applicable here. For example, the media guidance application may determine, based on start time code and end time code (e.g., (00:12:00:00) and (00:19:59:29) respectively) of media asset segment 108, that time code (00:13:00:02) corresponding to current progress point indicator 120 corresponds to media asset segment 108. The media guidance application may determine that the level of engagement of the viewer in media asset segment 108 of media asset 104 is 9. In some embodiments, the media guidance application may compute the third level of engagement based on the media consumption behavior of the viewer. In some embodiments, the media guidance application may compute the third level of engagement based on the average audience engagement score. Manners in which the media guidance application may perform these computations discussed previously are applicable here.

The media guidance application may determine whether both the first level of engagement and the third level of engagement exceed a threshold level of engagement in media asset 104. The media guidance application may access a data structure associated with a media guidance data source to retrieve the threshold level of engagement in media asset 104. Alternatively, the media guidance application may extract the threshold level of engagement in media asset 104 from metadata associated with media asset 104. The threshold level of engagement may be assigned by content provider of the media asset. Additionally or alternatively, the threshold level of engagement may be provided by a content provider of secondary content presented during breaks in the media asset. In some embodiments, the media guidance application may access a data structure associated with media asset 104 (e.g., threshold values data structure) to retrieve the threshold level of engagement in media asset 104. In some embodiments, the threshold level of engagement in media asset 104 may be a pre-assigned default value (e.g., 6). In alternative embodiments, the threshold level of engagement in media asset 104 may be a dynamic value determined based on levels of engagement of viewers in media asset 104 (e.g., average of levels of engagement of viewers+some factor). The media guidance application may, in response to determining that both the first level of engagement and the third level of engagement exceed the threshold level of engagement in media asset 104, determine that the viewer is engaged in media asset 104.

As an illustrative example, the media guidance application may determine the threshold level of engagement in media asset 104 is 6. In this case, the media guidance application may determine, because both the first level of engagement (i.e., 11) and the third level of engagement (i.e., 9) exceed the threshold level of engagement (i.e., 6), the viewer is engaged in media asset 104. In some embodiments, the media guidance application may set an "engaged in the media asset" flag associated with the viewer to "true" upon determining that the viewer is engaged in media asset 104.

The media guidance application may determine whether the second level of engagement exceeds a threshold level of engagement for the secondary content. The media guidance application may, in response to determining that the second level of engagement does not exceed the threshold level of engagement for the secondary content, determine that the viewer is not engaged in the secondary content. For example, the media guidance application may determine the threshold level of engagement in the secondary content (i.e., the advertisement for a waffle maker) presented during break 114 in media asset 104 is 5. In this case, the media guidance application may determine, because the second level of engagement (i.e., 3) does not exceed the threshold level of engagement for the secondary content (i.e., 5), the viewer is not engaged in the secondary content. In some embodiments, the media guidance application may set an "engaged in secondary content" flag associated with the viewer to "false" upon determining that the viewer is not engaged in the secondary content.

In some embodiments, the threshold level of engagement for the secondary content may be a function of the first level of engagement of the viewer in media asset segment 106 of a media asset. For example, the media guidance application may determine that the threshold level of engagement for the secondary content has to be increased linearly as a function of the first level of engagement. As an illustrative example, the media guidance application may compute the threshold level of engagement for the secondary content using the formula {some constant+(0.25*the first level of engagement)}.

The media guidance application may, in response to determining that the viewer is engaged in media asset 104 and the viewer is not engaged in the secondary content, generate for display secondary content related to media asset 104 during a second break (e.g., break 116) in media asset 104. Secondary content related to media asset 104 may be promotional content for media asset 104 (e.g., teaser trailer about what will be presented next in media asset 104 and other content that incentivizes the viewer to continue watching the media asset from the end point of the second break). For example, the media guidance application may determine that time codes (00:20:00:00) and (00:21:59:29) correspond to start point and end point of break 116 in media asset 104. Upon determining that current progress point indicator 120 in media asset 104 (e.g., (00:20:00:00)) corresponds to break 116, the media guidance application may present a trailer of what will be presented in media asset 104 right after the end of break 116.

In some embodiments, the media guidance application may determine whether to include, in a break a in a media asset, secondary content related to the media asset based on a level of engagement of a viewer in a segment of the media asset. The media guidance application may determine a level of engagement of a viewer in a segment of the media asset and compare the level of engagement with a threshold level of engagement for the media asset. The media guidance application may, upon determining that the level of engagement in the segment of the media asset does not exceed the threshold level of engagement for the media asset, include secondary content related to the media asset (e.g., a teaser trailer) in a break in the media asset. The media guidance application may, upon determining that the level of engagement in the segment of the media asset exceeds the threshold level of engagement for the media asset, may refrain from including secondary content related to the media asset in a break in the media asset.

In some embodiments, the media guidance application may access a data structure associated with a profile of the viewer to determine indicators of preferences of the viewer. Exemplary indicators of preferences of the viewer include but are not limited to genre (e.g., drama, comedy, romance), actors, type of characters (e.g., strong female lead, intelligent mastermind, jovial personality) and setting (e.g., manors, oceans, forests). The media guidance application may determine, based on the indicators of preferences of the viewer, an aspect of media asset 104 that is of most interest to the viewer. The aspect of media asset 104 that is of most interest to the viewer may be at least one of a character, a plotline, a setting and an event.

The media guidance application may determine an aspect of media asset 104 that is of most interest to the viewer by assigning a priority value to each aspect of media asset 104. The media guidance application may determine the priority value for an aspect based on level of similarity between the aspect and the indicators of preferences of the viewer. The media guidance application may determine the level of similarity by comparing metadata associated with the aspect with the indicators of preferences of the viewer. For example, the media guidance application may determine, from the indicators of preferences of the viewer, that the viewer enjoys watching content related to strong female leads and content related to the actress "Emilia Clarke." For the case when media asset 104 is "Game of Thrones," the media guidance application may assign character aspect "Daenerys Targaryen" (strong female protagonist portrayed by the actress "Emilia Clarke") a higher priority value than character aspect "Jon Snow" (male protagonist portrayed by another actor). The media guidance application may select the aspect with the highest priority value as the aspect of media asset 104 that is of most interest to the viewer. For example, the media guidance application may determine that the aspect of media asset 104 that that is of most interest to the viewer is character aspect "Daenerys Targaryen."

The media guidance application may determine a segment of media asset 104 to be presented subsequent to break 116 (e.g., frames from media asset segment 110 or media asset segment 112) that corresponds to the aspect of media asset 104 that is of most interest to the viewer. The media guidance application may include the segment in the secondary content related to the media asset. For example, upon identifying that the character "Daenerys Targaryen" of media asset 104 is of most interest to the viewer, the media guidance application may identify a frame in media asset 104 associated with the character "Daenerys Targaryen" that is to be presented subsequent to break 116 (e.g., frames from media asset segment 110 or media asset segment 112). For example, the media guidance application may determine that start time code and end time code for break 116 is (00:20:00:00) and (00:21:59:29) respectively. The media guidance application may identify the required frame by querying a data structure associated with media asset 104 for a frame that has a time code later than (00:21:59:29) and is associated with metadata "Daenerys Targaryen." The media guidance application may perform the query, using database management languages such as SQL, JAPQL, CODASYL or another suitable language. The media guidance application may include the frame associated with "Daenerys Targaryen" in a teaser trailer of what will be presented in media asset 104 after the second break.

In some embodiments, the media guidance application may include, in the secondary content related to media asset 104, an indication that additional secondary content related to media asset 104 will be presented during at least one of break 116 or another break in media asset 104 subsequent to break 116 (e.g., break 118). The media guidance application may generate for display, during at least one of break 116 or another break in the media asset subsequent to the break 116, the additional secondary content related to media asset 104. Following from the previous example, where media asset 104 is "Game of Thrones," the media guidance application may display, in the secondary content related to "Game of Thrones," a message such as "Do not miss a preview of what happens to 'Daenerys Targaryen.' Preview will be presented during the break." The media guidance application may then present a frame associated with the character "Daenerys Targaryen" at a later point in break 116. Informing the viewer that that additional secondary content related to media asset 104 will be presented during breaks makes the viewer less likely to skip watching secondary content presented during breaks for fear of missing the additional secondary content.

In some embodiments, the additional secondary content presented during at least one of break 116 or another break in the media asset subsequent to the break 116 may not be a segment of media asset 104. Examples of additional secondary content that is not a segment of media asset 104 include but are not limited to interviews of the cast, directors and other personnel associated with media asset 104, events associated with media asset 104 (e.g., viewing party with the cast, upcoming premier of media asset 104), and behind the scenes footage. In some embodiments, the media guidance application may retrieve, from a data structure associated with secondary content, secondary content candidates that are related to media asset 104 that are not segments of the media asset. For example, the media guidance application may retrieve a list of secondary content identifiers corresponding to secondary content comprising interviews of cast members of media asset 104.

The media guidance application may retrieve, from a data structure associated with a profile of the viewer, an indicator of a preference of the viewer. Examples of an indicator of a preference of the viewer include but are not limited to genre, actors, type of characters and setting. For example, the media guidance application may determine that an indicator of a preference of the viewer is the actress "Emilia Clarke" who plays a major character in media asset "Game of Thrones." The media guidance application may determine the additional secondary content by identifying a secondary content candidate of the secondary content candidates that is associated with the indicator of the preference of the viewer. In an illustrative example where media asset 104 is "Game of Thrones," the media guidance application may identify, from a list of secondary content identifiers for secondary content related to the media asset, an identifier corresponding to a secondary content comprising an interview of actress "Emilia Clarke." The media guidance application may then retrieve the secondary content comprising an interview of actress "Emilia Clarke" and present it during break 116 or another break in media asset 104 subsequent to break 116.

In some embodiments, the media guidance application may determine whether a viewer's level of engagement belongs to a specific sub-category (e.g., moderately engaged, highly engaged, very highly engaged). The media guidance application may, in response to determining that the viewer's level of engagement belongs to a specific sub-category, present secondary content associated with both the sub-category and a preference of the viewer. In some embodiments, the secondary content related to media asset 104 may be primary secondary content and the threshold level of engagement in media asset 104 may be a first threshold level of engagement in media asset 104. The media guidance application may retrieve, from a first data structure associated with a profile of the viewer, indicators of preferences of the viewer. For example, the media guidance application may retrieve actress "Emilia Clarke," strong female lead and fantasy genre as indicators of preference of the viewer. The media guidance application may retrieve, from a second data structure containing secondary content, additional secondary content that is associated with at least one of the indicators of preferences of the viewer and a second threshold level of engagement in media asset 104. The media guidance application may generate for display, during break 116 in media asset 104, the additional secondary content subsequent to display of the primary secondary content related to media asset 104.

The media guidance application may determine that there is a first threshold level of engagement in media asset 104 (e.g., the first threshold level of engagement in the media asset) to broadly categorize viewers into one of two groups: engaged in media asset 104 and not engaged in media asset 104. The media guidance application may determine there is a second threshold level of engagement in media asset 104 to further sub-categorize the group that is engaged in media asset 104. For example, the media guidance application may determine, based on the second threshold level of engagement in media asset 104, whether a viewer is highly engaged in the media asset.

As an illustrative example, the media guidance application may determine that the second threshold level of engagement in media asset 104, where media asset 104 is "Game of Thrones," is 8. Upon determining that levels of engagement of a viewer in media asset segment 106 and media asset segment 108 exceed 8, the media guidance application may determine that the viewer is highly engaged in the media asset. The media guidance application may determine that secondary content promoting a fantasy genre convention is associated with the second threshold level of engagement in media asset 104. For example, the media guidance application may determine, based on metadata associated with the promotion for a fantasy genre convention, that the promotion is intended only for viewers who are highly engaged in media asset 104 (i.e., engagement levels 8 or higher). The media guidance application may determine that secondary content promoting a fantasy themed theme park is not associated with the second threshold level of engagement in media asset 104. For example, the media guidance application may determine the promotion for fantasy themed theme park is targeted for viewers who are moderately engaged in media asset 104 (e.g., engagement levels ranging from 6-7) and consequently, not associated with the second threshold level of engagement in media asset 104. The media guidance application may determine, based on the first engagement level of 11 and the third engagement level of 9, that the viewer is highly engaged in media asset 104. The media guidance application may then retrieve secondary content promoting a fantasy genre convention because it is associated with the second threshold level of engagement in media asset 104 and fantasy genre (i.e., an indicator of preferences of the viewer). The media guidance application may then generate for display, during break 116 and subsequent to display of a teaser trailer for media asset 104, the secondary content promoting a fantasy genre convention.

In some embodiments, the media guidance application may select additional secondary content based on the viewer's secondary content engagement history data. As an illustrative example, secondary content engagement history data of a viewer may include engagement scores of the viewer for different types of secondary content. For example, the media guidance application may monitor, across multiple user devices associated with the viewer, indicators of engagement of the viewer in secondary content. As an illustrative example, the media guidance application may monitor for percentage of secondary content viewed, progress point in secondary content when channel switches are requested, volume changes made during the progression of the secondary content, changes in playback speed and other such actions. The media guidance application may monitor indicators of engagement of the viewer in secondary content over a period of time and use the data to compute engagement scores for the different types of secondary content.

As an illustrative example, the media guidance application may determine an engagement score in a secondary content by computing the weighted sum of values corresponding to various indicators of engagement for that secondary content. The media guidance application may then perform various types of data analytics (e.g., correlation, regression analysis and other suitable analysis) to determine relationships between metadata associated with secondary content (e.g., theme, genre, characteristic, brands) and engagement scores. For example, the media guidance application may determine, based on the data analytics, that the viewer has high engagement scores for secondary content associated with automobiles and low engagement scores for secondary content associated kitchen products. The media guidance application may utilize the relationships between metadata associated with secondary content and engagement scores to determine the type of additional secondary content to present. For example, the media guidance application may select a promotion for a car instead of a promotion for a frying pan for display during a break in media asset 104.

As another illustrative example, the media guidance application may determine that a viewer frequently skips promotions related to household cleaning products. The media guidance application may include in the viewer's secondary content engagement history data an indication that the viewer has low engagement in secondary content associated with household cleaning products. The media guidance application may determine that the viewer always watches promotions related to sports cars. The media guidance application may include in the viewer's secondary content engagement history data an indication that the viewer has high engagement in secondary content associated with sports cars. Based on the viewer's secondary content engagement history data, the media guidance application may select a promotion for a sports car instead of a promotion for a household cleaning product for display during a break in media asset 104.

In some embodiments, there may be different versions of secondary content associated with a given entity. For example, a luxury car may have a promotion that is set in urban areas and another promotion set in rural areas. In some embodiments, the media guidance application may use the viewer's secondary content engagement history data to select version of secondary content associated with a given entity that would be most suited to the viewer. As an illustrative example, the media guidance application may determine, in manners discussed previously, that the viewer has high engagement scores for secondary content associated with urban settings and low engagement scores for secondary content associated with wilderness settings. In this case, the media guidance application may select the promotion for the luxury car that is set in urban areas for display during a break in media asset 104. As another illustrative example, the media guidance application may determine that the viewer has high engagement scores for action-packed car commercials (e.g., commercial with a car chase) and low engagement scores for slow-paced car commercials (e.g., commercial that entails driving slowly along the coast). In this case, the media guidance application may select the promotion for the luxury car that is action-packed for display during a break in media asset 104.

In some embodiments, there may be different versions of secondary content related to the media asset. For example, there may be two different versions of a teaser trailer of what will be presented in "Game of Thrones" after the second break, where the first version is narrated by female character "Daenerys Targaryen" and the second version is narrated by male character "Joffrey Baratheon." In some embodiments, the media guidance application may use the viewer's secondary content engagement history data to select version of secondary content related to the media asset that would be most suited to the viewer. As an illustrative example, the media guidance application may determine, in manners discussed previously, that the viewer has high engagement scores for secondary content associated with female narrators and low engagement scores for secondary content associated with male narrators. In this case, the media guidance application may select version of the teaser trailer that is narrated by female character "Daenerys Targaryen" for display during a break in media asset 104.

In some embodiments, the media guidance application may determine a type of secondary content to be presented during a break in a media asset based on a level of engagement of a viewer in the media asset. The media guidance application may determine, as discussed above, a first level of engagement of a viewer in a first segment of a media asset. The media guidance application may compare the first level of engagement with a threshold level of engagement in the media asset to determine whether the viewer is engaged in the media asset. The media guidance application, upon determining that the first level of engagement exceeds the threshold level of engagement in the media asset, may determine that the viewer is engaged in the media asset. In this case, the media guidance application may determine that the viewer does not require additional incentive to continue consuming the media asset. The media guidance application may include secondary content not related to the media asset (e.g., commercials) in a break in the media asset where the break is subsequent to the first segment. The media guidance application, upon determining that the first level of engagement does not exceed the threshold level of engagement in the media asset, may determine that the user is not engaged in the media asset. In this case, the media guidance application may determine that presenting only secondary content not related to the media asset (e.g., commercials) during the break in the media asset may cause the viewer to lose interest in the media asset completely. Accordingly, the media guidance application may generate for display secondary content related to the media asset (e.g., a teaser trailer about what will be presented next in the media asset or other content that incentivizes the viewer to continue watching the media asset from the end point of the break) during the break in the media asset.

In some embodiments, the media guidance application may select additional secondary content based on the average audience engagement level of viewers in a media asset. The media guidance application may determine that, in order include a secondary content in a break during a media asset, the average audience engagement level must exceed a threshold average audience engagement level. The media guidance application may extract the threshold average audience engagement level from metadata associated with the secondary content. Additionally or alternatively, the media guidance application may receive the threshold average audience engagement level from content provider providing the secondary content. For example, the media guidance application may determine that a promotion for an economy car is associated with a threshold average audience engagement level of 5 and can be included in a break in a media asset if the average audience engagement level of viewers in the media asset exceeds 5. The media guidance application may determine that a promotion for a luxury car is be associated with a threshold average audience engagement level of 9 and can be included in a break in a media asset if the average audience engagement level of viewers in the media asset exceeds 9. The media guidance application, upon determining that the average audience engagement level of viewers in media asset 104 is 7, may determine that the promotion for a luxury car can not be displayed during a break in media asset 104. The media guidance application may display the promotion for an economy car during a break in media asset 104.

In some embodiments, the media guidance application may determine an average audience engagement level of viewers in a given media asset and provide the average audience engagement level in the given media asset to content providers of secondary content (e.g., advertisement source 524, advertisement decision engines, demand side platforms, and other suitable content providers of secondary content). The media guidance application may determine the average audience engagement level in the given media asset in manners discussed previously. The media guidance application may include the average audience engagement level in the given media asset in metadata associated with the given media asset and transmit the metadata to content providers of secondary content. Content providers of secondary content may use the average audience engagement level in the given media asset to determine secondary content to be presented to a viewer during breaks in the given media asset.

As an illustrative example, the media guidance application may determine that average audience engagement level in the media asset "Game of Thrones" is 8, and transmit an indication (e.g., a data packet) to advertisement source 524 that the average audience engagement level in "Game of Thrones" is 8. Advertisement source 524 may use the average audience engagement level in "Game of Thrones" along with appropriate advertisement logic to determine which advertisements to transmit to a viewer during breaks in "Game of Thrones." For example, advertisement source 524 may query a database of advertisement for advertisements that may be presented in breaks of media assets having average audience engagement level of 8 and lower. As an illustrative example, the media guidance application may determine that an advertisement for an economy car can be included in breaks of media assets having average audience engagement level of 8 and lower. Accordingly, advertisement source 524 may select the advertisement for the economy car for inclusion in a break in "Game of Thrones."

In some embodiments, the secondary content may be primary secondary content and the media guidance application may generate for display, during break 116 in the media asset, additional secondary content subsequent to display of the primary secondary content related to media asset 104. For example, the media guidance application may generate for display, during the break 116 in media asset 104, a teaser trailer for media asset 104 followed by a promotion for a fantasy genre convention. The media guidance application may determine a fourth level of engagement of the viewer in the additional secondary content. Manners in which the media guidance application may perform this determination discussed previously are applicable here. For example, the media guidance application may determine level of engagement of the viewer in the promotion for a fantasy genre convention to be 7. The media guidance application may determine a fifth level of engagement of the viewer in media asset segment 110, where media asset segment 110 is subsequent to the break 116. For example, the media guidance application may determine that time codes (00:22:00:00) and (00:29:59:29) correspond to start point and end point of media asset segment 110 in media asset 104. The media guidance application may determine, in manners described previously, that level of engagement of the viewer in media asset segment 110 is 10.

The media guidance application may determine whether the fifth level of engagement exceeds the threshold level of engagement in media asset 104. The media guidance application may, in response to determining that the fifth level of engagement exceeds the threshold level of engagement in media asset 104, determine that the viewer remains engaged in media asset 104. For example, the media guidance application may determine, because the level of engagement of the viewer in media asset segment 110 (i.e., 10) exceeds the threshold level of engagement in media asset 104 (i.e., 6), the viewer remains engaged in media asset 104.

The media guidance application may determine whether the fourth level of engagement exceeds a threshold level of engagement for the additional secondary content. The media guidance application may, in response to determining that the fourth level of engagement exceeds the threshold level of engagement for the additional secondary content, determine that the viewer is engaged in the additional secondary content. For example, the media guidance application may determine, because the level of engagement of the viewer in the promotion for a fantasy genre convention (i.e., 7) exceeds the threshold level of engagement for the promotion for a fantasy genre convention (e.g., 5), the viewer is engaged in the promotion for a fantasy genre convention.

The media guidance application may, in response to determining that the viewer remains engaged in media asset 104 and the viewer is engaged in the additional secondary content, refrain from generating for display the additional secondary content related to media asset 104 during break 118, where break 118 is subsequent to media asset segment 110. For example, the media guidance application may determine that time codes (00:30:00:00) and (00:31:59:29) correspond to start point and end point respectively of break 118. The media guidance application may display secondary content promoting consumer goods during break 118.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, web-sites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

Figure 2:
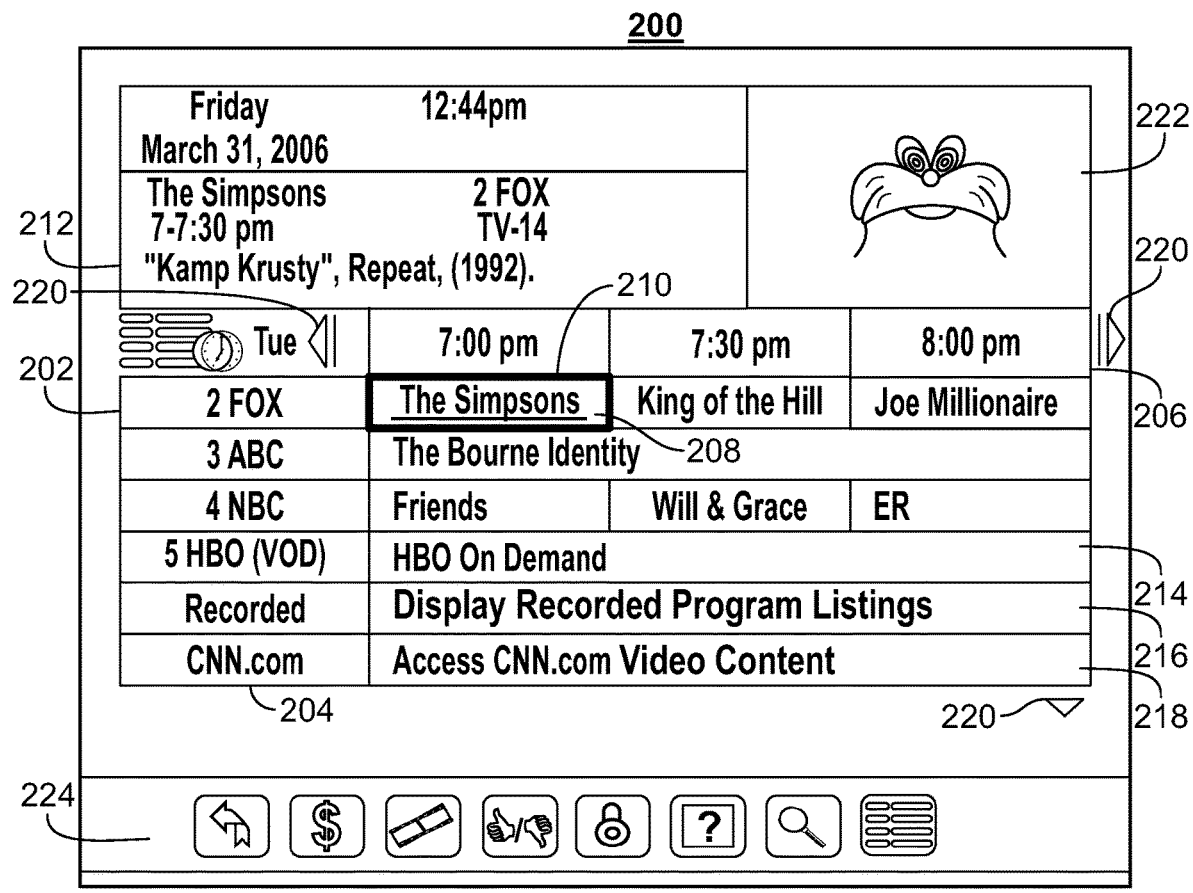
FIG. 2 shows an illustrative embodiment of a display screen that may be used to provide media guidance application listings and other media guidance information, in accordance with some embodiments of the disclosure.
Figure 3:
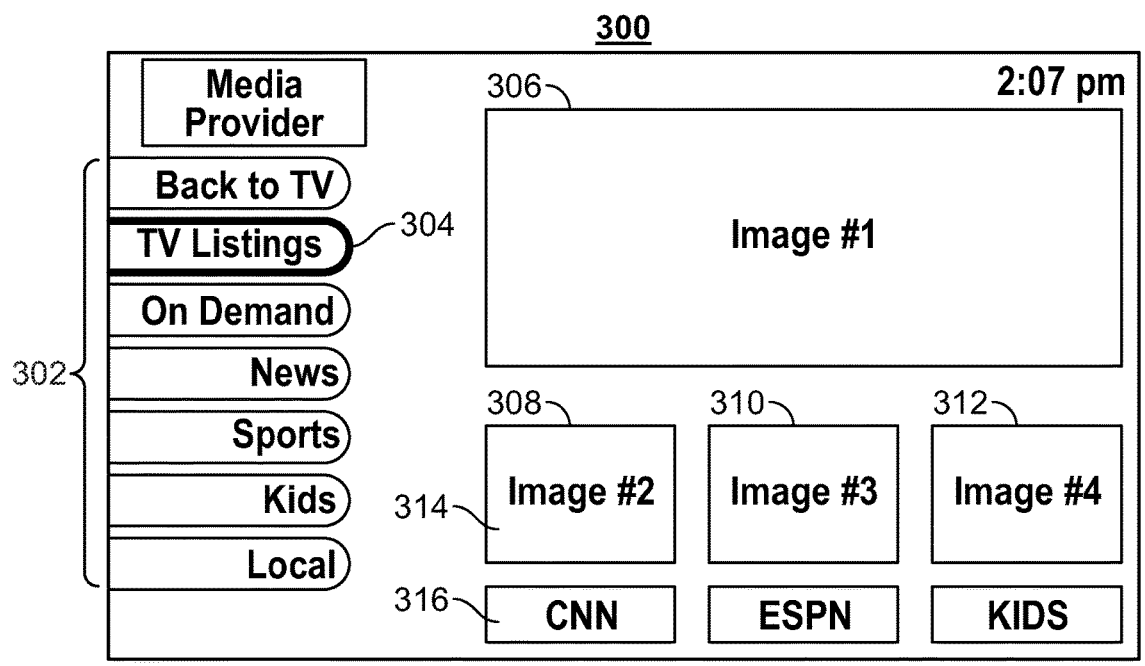
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
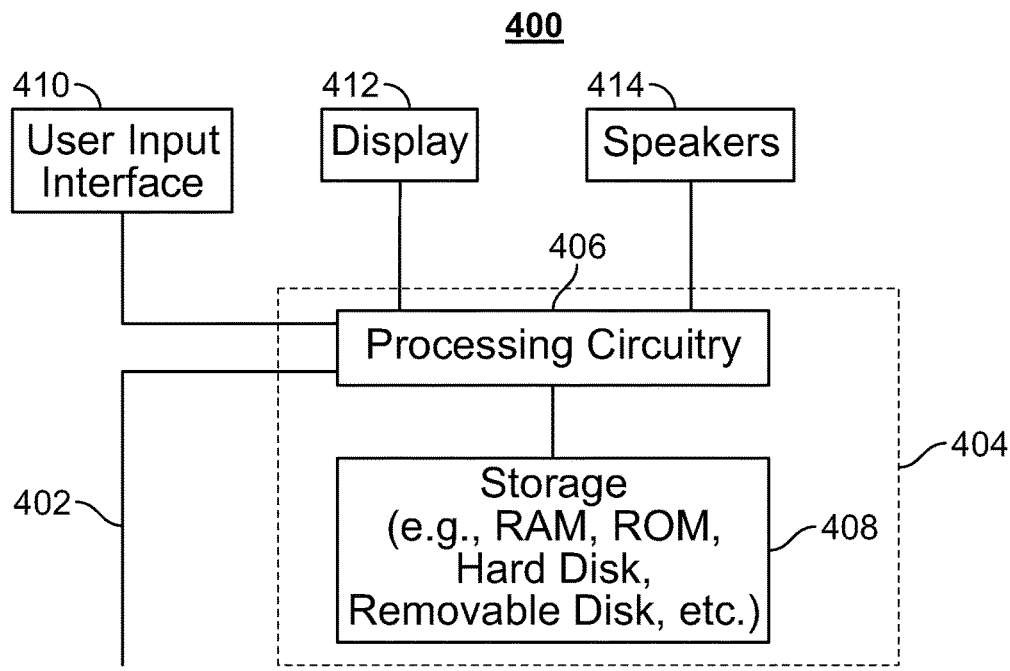
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
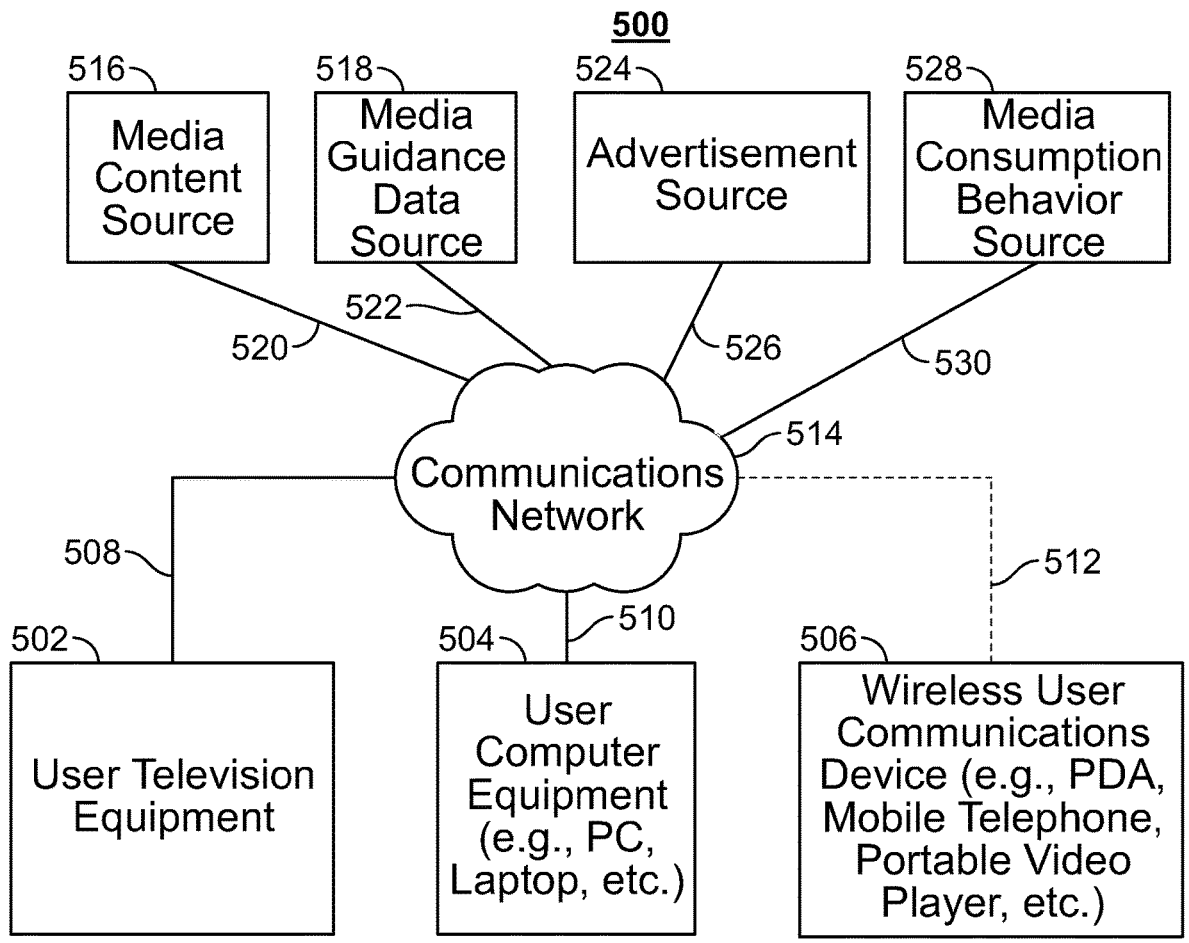
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. System 500 may also include a media consumption behavior source 528 coupled to communications network 514 via a communications path 530. Path 530 may include any of the communication paths described above in connection with paths 508, 510, and 512. Media consumption behavior source 528 may include media consumption behavior history associated with a plurality of viewers.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
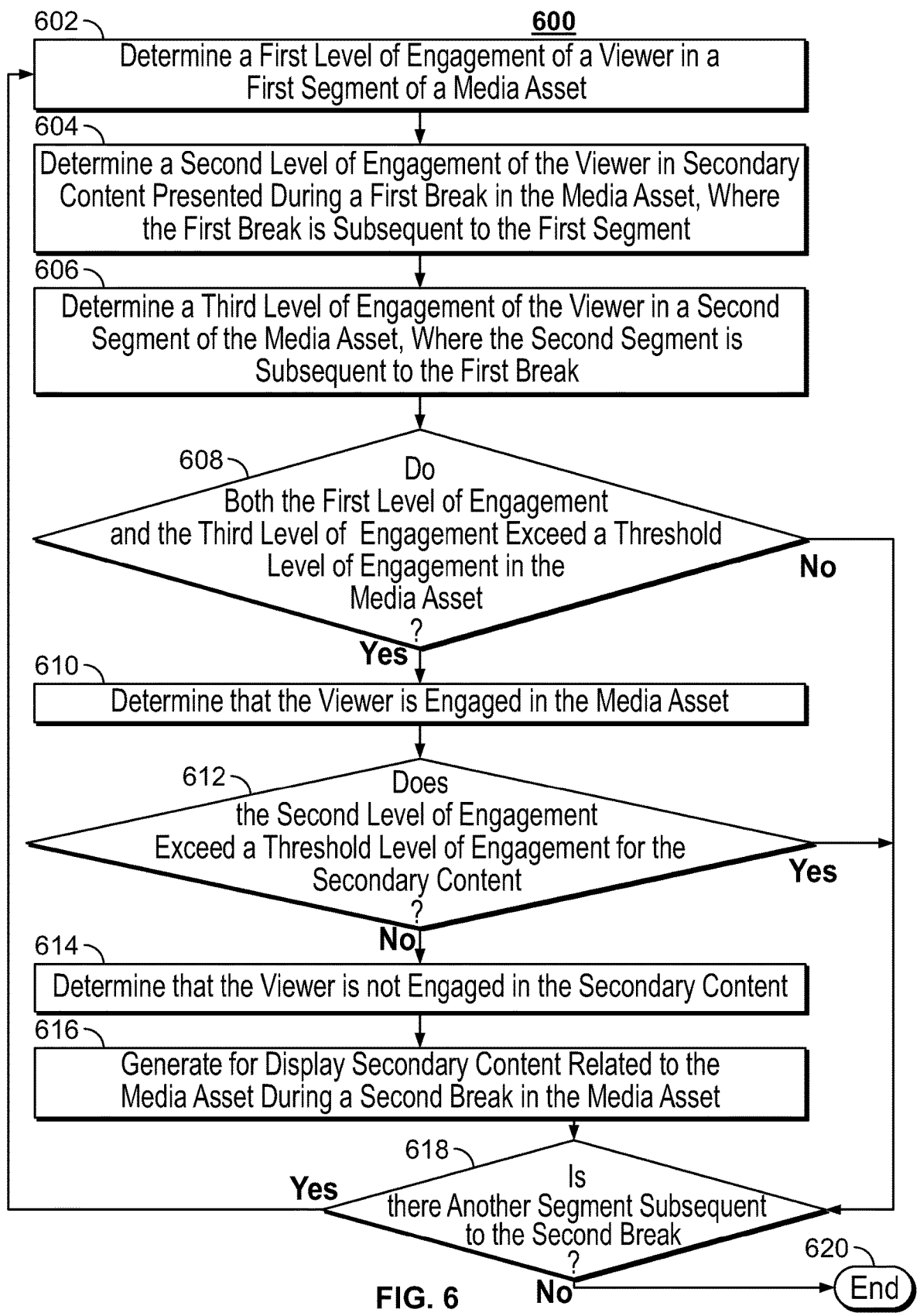
FIG. 6 is a flowchart of illustrative steps involved in determining whether to display secondary content related to media asset being viewed during a break in the media asset, in accordance with some embodiments of the disclosure.

FIG. 6 is a flowchart of illustrative steps involved in determining whether to display secondary content related to media asset being viewed during a break in the media asset, in accordance with some embodiments of the disclosure. Process 600 may be used to determine whether a viewer is engaged a media asset but has high propensity to skip secondary content presented during breaks in the media asset and based on this determination, present secondary content related to the media asset during a break in the media asset. Process 600 may be executed by control circuitry 404 (FIG. 4) as instructed by the media guidance application. Control circuitry 404 may be implemented on user equipment 502, 504, and/or 506 (FIG. 5). In addition, one or more steps of process 600 may be incorporated into or combined with one or more steps of any other process or embodiment.

Process 600 begins at 602, where control circuitry 404 determines a first level of engagement of a viewer in a first segment of a media asset. For example, control circuitry 404 may determine that level of engagement of a viewer in media asset segment 106 of media asset 104 (e.g., Game of Thrones) to be 11. Manners in which control circuitry 404 may perform this determination discussed previously are applicable here. Process 600 continues to 604, where control circuitry 404 determines a second level of engagement of the viewer in secondary content presented during a first break in the media asset, where the first break is subsequent to the first segment. For example, control circuitry 404 may determine that level of engagement of the viewer in a waffle maker advertisement presented during break 114 in media asset 104, where break 114 is subsequent to media asset segment 106, is 4. Process 600 continues to 606 where control circuitry 404 determines a third level of engagement of the viewer in a second segment of the media asset, where the second segment is subsequent to the first break. For example, control circuitry 404 may determine that the level of engagement of the viewer in media asset segment 108 of media asset 104, where media asset segment 108 is subsequent to break 114, to be 10.

Process 600 continues to 608 where control circuitry 404 determines whether both the first level of engagement and the third level of engagement exceed a threshold level of engagement in the media asset. For example, control circuitry 404 may access a data structure located at media guidance data source 518 to retrieve the threshold level of engagement in media asset 104. Alternatively, control circuitry 404 may extract the threshold level of engagement in media asset 104 from metadata associated with media asset 104. In some embodiments, control circuitry 404 may access a data structure, located at any of media content source 516 or storage 408, associated with media asset 104 (e.g., threshold values data structure) to retrieve the threshold level of engagement in media asset 104. In some embodiments, the threshold level of engagement in media asset 104 may be a pre-assigned default value (e.g., 6). In alternative embodiments, the threshold level of engagement in media asset 104 may be a dynamic value determined based on levels of engagement of viewers in media asset 104 (e.g., average of levels of engagement of viewers in media asset 104+some factor). Control circuitry 404 may use a Boolean comparison function to determine whether both level of engagement in media asset segment 106 and level of engagement in media asset segment 108 exceed the threshold level of engagement in media asset 104.

If, at 608, control circuitry 404 determines that both the first level of engagement and the third level of engagement exceed the threshold level of engagement in the media asset, process 600 continues to 610. At 610, control circuitry 404 determines that the viewer is engaged in the media asset. For example, control circuitry 404 may determine that the threshold level of engagement in media asset 104 is 6 and that both level of engagement in media asset segment 106 (e.g., 11) and level of engagement in media asset segment 108 (e.g., 10) exceed the threshold level of engagement in media asset 104. At 610, control circuitry 404 may set an "engaged in the media asset" flag for the viewer to "true" upon determining that the viewer is engaged in media asset 104.

Process 600 continues to 612 where control circuitry 404 determines whether the second level of engagement exceeds a threshold level of engagement for the secondary content. Control circuitry 404 may access advertisement source 524 to determine the threshold level of engagement in the secondary content. For example, the media guidance application may determine that the threshold level of engagement in the advertisement for a waffle maker, presented during break 114 in media asset 104, is 5. If, at 612, control circuitry 404 determines that the second level of engagement does not exceed the threshold level of engagement for the secondary content, process continues to 614. At 614, control circuitry 404 determines that the viewer is not engaged in the secondary content. For example, control circuitry 404 may determine that level of engagement in the advertisement for a waffle maker (e.g., 4), presented during break 114, is less than the threshold level of engagement in the advertisement for a waffle maker. At 610, control circuitry 404 may set, upon determining that the viewer is not engaged in the secondary content presented during break 114, an "engaged in secondary content" flag for the viewer to "false."

Process 600 continues to 616 where control circuitry 404 generates for display secondary content related to the media asset during a second break in the media asset. For example, control circuitry 404 may generate for display promotional content for media asset 104 (e.g., teaser trailer about what will be presented next in media asset 104 and other content that incentivizes the viewer to continue watching media asset 104 from the end point of break 114). Control circuitry 404 may retrieve the secondary content related to media asset 104 from any of media content source 516, media guidance data source 518 and advertisement source 524. Process 600 continues to 618 from 616. If, at 608, control circuitry 404 determines that both the first level of engagement and the third level of engagement do not exceed the threshold level of engagement in the media asset, process 600 continues to 618. If, at 612, control circuitry 404 determines that the second level of engagement exceeds the threshold level of engagement for the secondary content, process continues to 618.

At 618, control circuitry 404 determines whether there is another segment subsequent to the second break. If, at 618, control circuitry 404 determines that there is another segment subsequent to the second break, process 600 reverts to 602. For example, control circuitry 404 may determine that media asset segment 110 is subsequent to break 116 and process 600 may revert to 602. As an illustrative example, control circuitry 404 may update the first segment with a pointer to media asset segment 110, second segment with a pointer to media asset segment 110, first break with a pointer to break 116 and second break with a pointer to break 118. Process 600 may then iterate through determining whether to present secondary content related to the media Asset 104 during break 118. If, at 618, control circuitry 404 determines that there is no other segment subsequent to the second break, process 600 continues to 620. At 620, process 600 ends.

Figure 7:
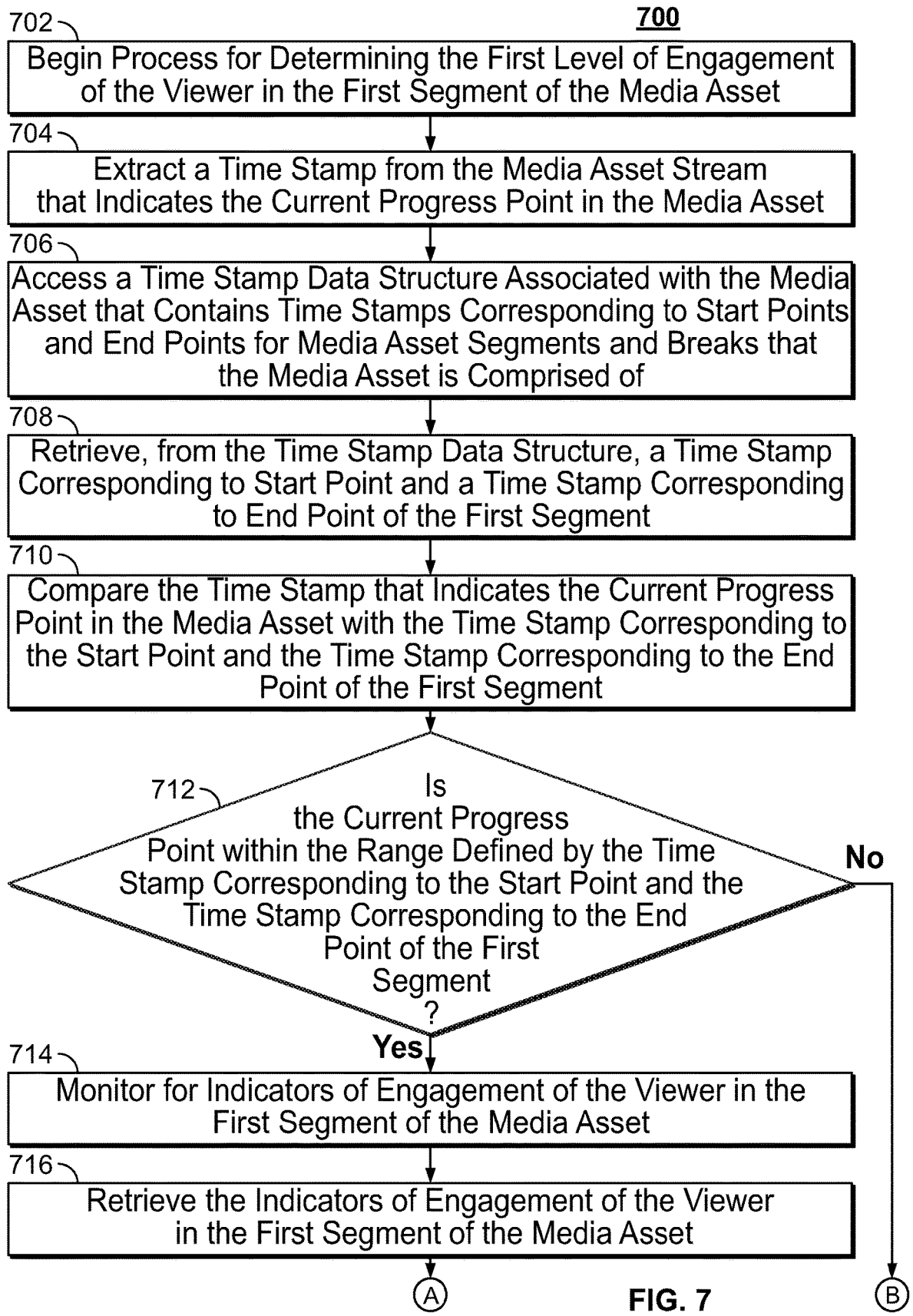
FIG. 7 is a flowchart of illustrative steps involved in determining level of engagement of a viewer in a segment of a media asset, in accordance with some embodiments of the disclosure.
Figure 7:
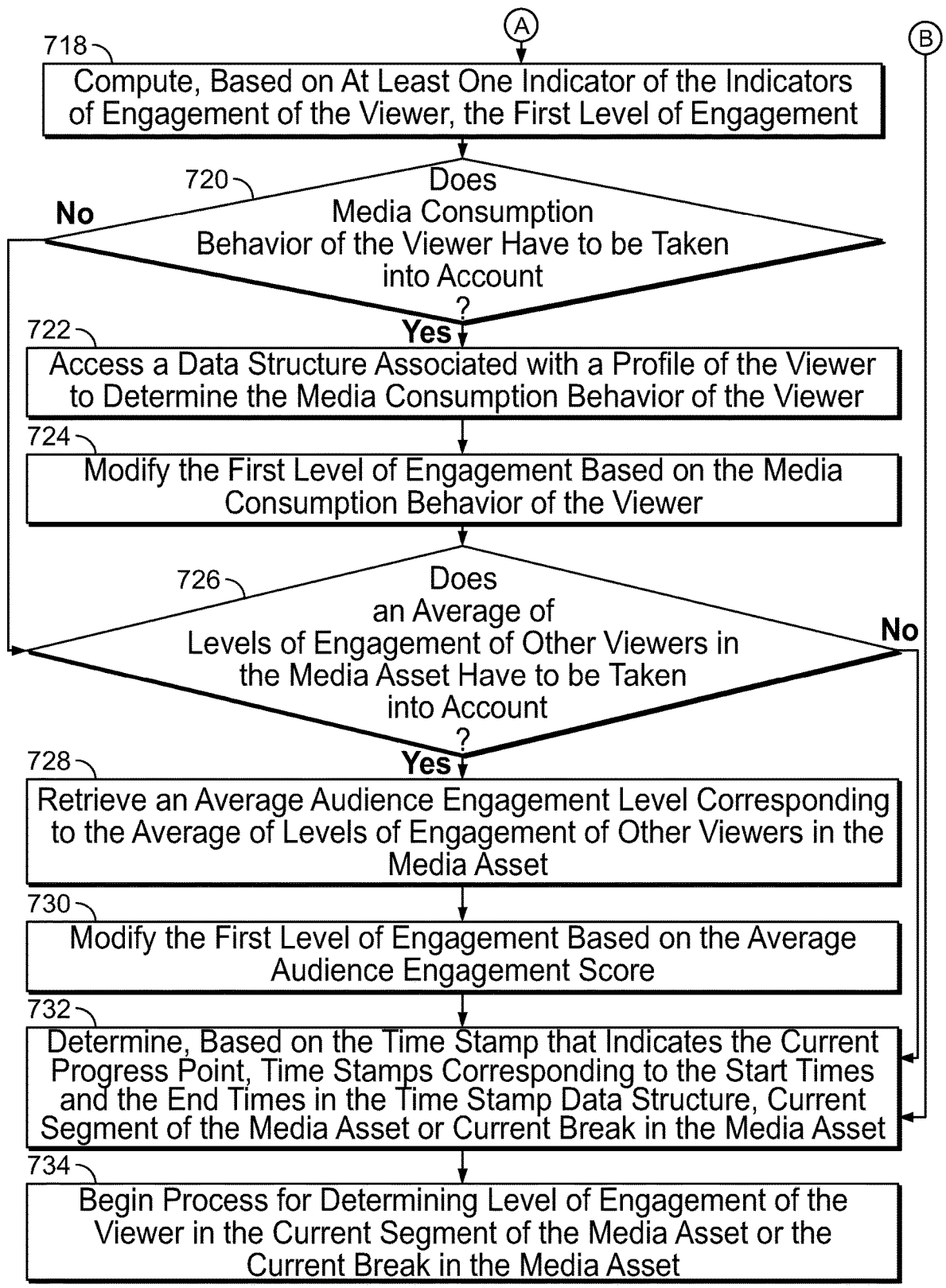

FIG. 7 is a flowchart of illustrative steps involved in determining level of engagement of a viewer in a segment of a media asset, in accordance with some embodiments of the disclosure. Process 700 may be used to determine which segment of the media asset or which break in the media asset the current progress point in the media asset corresponds to and determine the level of engagement in the determined segment or break. Process 700 may be executed by control circuitry 404 (FIG. 4) as instructed by the media guidance application. Control circuitry 404 may be implemented on user equipment 502, 504, and/or 506 (FIG. 5). In addition, one or more steps of process 700 may be incorporated into or combined with one or more steps of any other process or embodiment.

Process 700 begins at 702 where control circuitry 404 begins process for determining the first level of engagement of the viewer in the first segment of the media asset. Process 700 continues to 704, where control circuitry 404 extracts a time stamp from the media asset stream that indicates the current progress point in the media asset. For example, control circuitry 404 may extract time code (00:01:00:02) for current progress point indicator 120 in media asset 104. Process 700 continues to 706 where control circuitry 404 accesses a time stamp data structure associated with the media asset that contains time stamps corresponding to start points and end points for media asset segments and breaks that the media asset is comprised of. For example, control circuitry 404 may access a time stamp data structure, associated with media asset 104, that contains time stamps for start point and end point of media asset segment 106, media asset segment 108, media asset segment 110, media asset segment 112, break 114, break 116 and break 118.

Process 700 continues to 708 where control circuitry 404 retrieves, from the time stamp data structure, a time stamp corresponding to start point and a time stamp corresponding to end point of the first segment. For example, control circuitry 404 may retrieve, from a time stamp data structure associated with media asset 104, time codes (00:00:00:00) and (00:09:59:29) corresponding to the start point and the end point respectively of media asset segment 106. Process 700 continues to 710 where control circuitry 404 compares the time stamp that indicates the current progress point in the media asset with the time stamp corresponding to the start point and the time stamp corresponding to the end point of the first segment. For example, control circuitry 404 may compare the time stamp that corresponds to current progress point indicator 120 in media asset 104 with the time stamp corresponding to the start point and the time stamp corresponding to the end point of media asset segment 106. Process 700 continues to 712 where control circuitry 404 determines whether the current progress point is within the range defined by the time stamp corresponding to the start point and the time stamp corresponding to the end point of the first segment.

If, at 712, control circuitry 404 determines that the current progress point is within the range defined by the time stamp corresponding to the start point and the time stamp corresponding to the end point of the first segment, process 700 continues to 714. For example, control circuitry 404 may determine, because time code for current progress point indicator 120 (e.g., 00:01:00:02) is within the range defined by the start time code and the end time code (i.e., (00:00:00:00) and (00:9:59:29) respectively) of media asset segment 106, current progress point indicator 120 corresponds to media asset segment 106. At 714, control circuitry 404 monitors for indicators of engagement of the viewer in the first segment of the media asset. For example, control circuitry 404 may interact with a variety of monitoring devices (e.g., image and video capture devices, motion, physiological, and neurological sensors and other suitable monitoring devices) to monitor for the indicators of engagement. Process 700 continues to 716 where control circuitry 404 retrieves the indicators of engagement of the viewer in the first segment of the media asset. For example, control circuitry 404 may retrieve quantitative values for facial expressions, viewer motion and amount of content fast-forwarded through (e.g., 5, −5, and 11 respectively). Manners in which control circuitry 404 may perform this retrieval discussed previously are applicable here.

Process 700 continues to 718 where control circuitry 404 computes, based on at least one indicator of the indicators of engagement of the viewer, the first level of engagement. Manners in which control circuitry 404 may compute the first level of engagement discussed previously are applicable here. As an illustrative example, control circuitry 404 may use the formula (facial expressions value+viewer motion value+amount of content fast-forwarded through value) and compute the level of engagement in media asset segment to be 11. Process 700 continues to 720 where control circuitry 404 determines whether media consumption behavior of the viewer has to be taken into account. If, at 720, control circuitry 404 determines that the media consumption behavior of the viewer has to be taken into account, process 700 continues to 722. At 722, control circuitry 404 accesses a data structure associated with a profile of the viewer to determine the media consumption behavior of the viewer. For example, control circuitry 404 may access a user profile data structure, located at storage 408, media guidance data source 518 or media consumption behavior source 528, to determine the media consumption behavior of the viewer. For example, control circuitry 404 may determine, based on the media consumption behavior retrieved from the user profile data structure, that the viewer typically has a high degree of motion while viewing media assets.

Process 700 continues to 724 where modifies the first level of engagement based on the media consumption behavior of the viewer. For example, because high degree of motion is not necessarily equivalent to the viewer expressing disinterest in media assets, control circuitry 404 may decrease the weight corresponding to the viewer motion indicator. As an illustrative example, control circuitry 404 may adjust the formula for computing the first level of engagement from (facial expressions value+viewer motion value+amount of content fast-forwarded through value) to (facial expressions value+0.2×viewer motion value+amount of content fast-forwarded through value). Following from the previous example, the media guidance application may compute the first level of engagement to be 15. Process 700 continues to 726 where control circuitry 404 determines whether an average of levels of engagement of other viewers in the media asset has to be taken into account.

If, at 726, control circuitry 404 determines that an average of levels of engagement of other viewers in the media asset has to be taken into account, process 700 continues to 728. At 728, control circuitry 404 retrieves an average audience engagement level corresponding to the average of levels of engagement of other viewers in the media asset. Process 700 continues to 730 where modifies the first level of engagement based on the average audience engagement score. Process 700 continues to 732 where control circuitry 404 determines, based on the time stamp that indicates the current progress point, the start times and the end times in the time stamp data structure, current segment of the media asset or current break in the media asset. For example, control circuitry 404 may determine that the time code for current progress point indicator 120 is (00:11:00:02) and the current break in media asset 104 is break 114. Process 700 continues to 734 where begin process for determining level of engagement of the viewer in the current segment of the media asset or the current break in the media asset. For example, control circuitry 404 may begin process for determining level of engagement of the viewer in secondary content presented during break 114.

Figure 8:
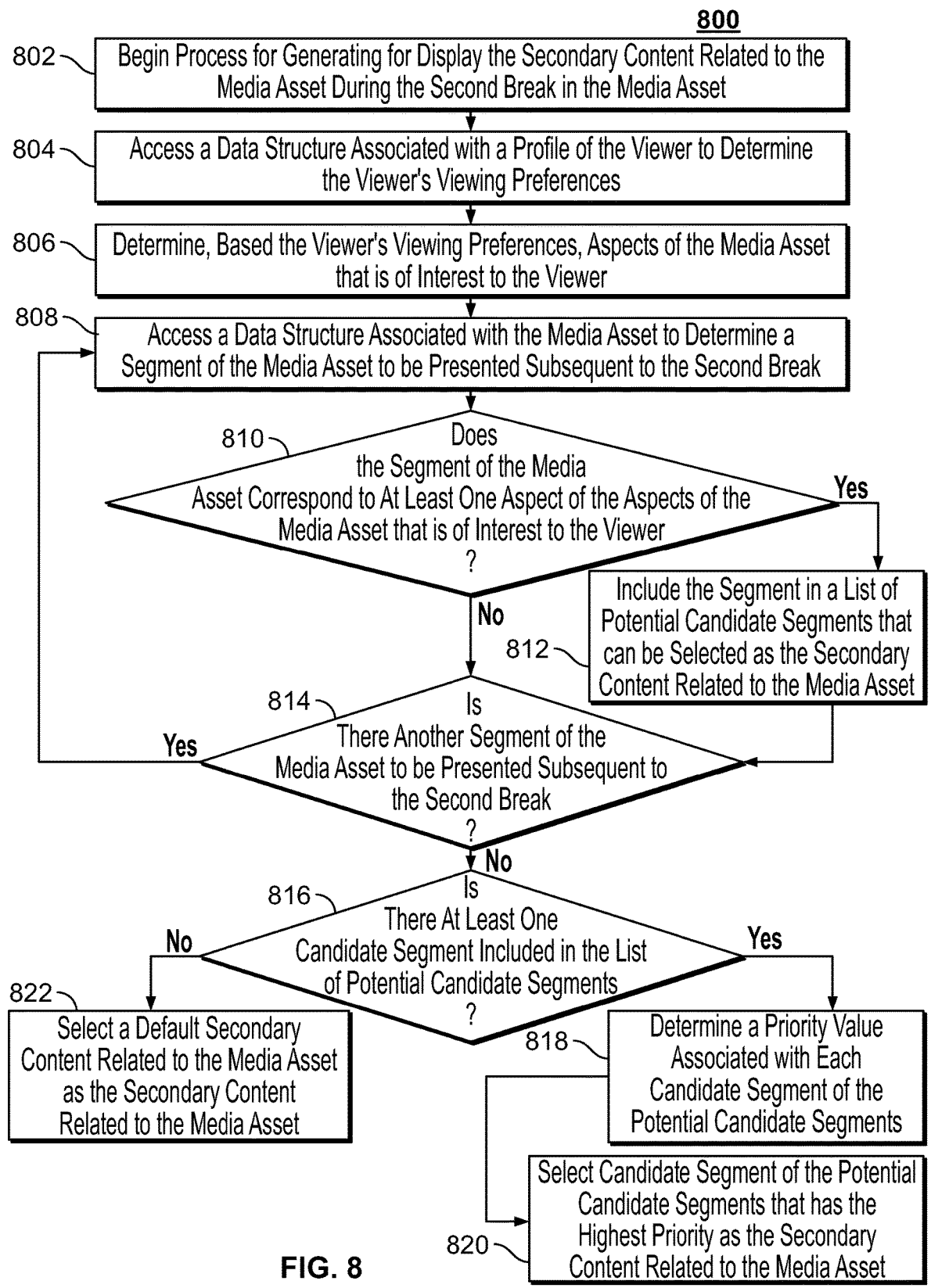
FIG. 8 is a flowchart of illustrative steps involved in generating for display, during a break in a media asset, secondary content related to the media asset, in accordance with some embodiments of the disclosure.

FIG. 8 is a flowchart of illustrative steps involved in generating for display, during a break in a media asset, secondary content related to the media asset, in accordance with some embodiments of the disclosure. Process 800 may be executed by control circuitry 404 (FIG. 4) as instructed by the media guidance application. Control circuitry 404 may be implemented on user equipment 502, 504, and/or 506 (FIG. 5). In addition, one or more steps of process 800 may be incorporated into or combined with one or more steps of any other process or embodiment.

Process 800 begins at 802 where control circuitry 404 begins process for generating for display the secondary content related to the media asset during the second break in the media asset. For example, control circuitry 404 may begin process for generating for display secondary content related to media asset 104 during break 116. Process 800 continues to 804 where control circuitry 404 accesses a data structure associated with a profile of the viewer to determine the viewer's viewing preferences. For example, control circuitry 404 may determine that the viewer likes watching content related to strong female leads and content related to actress "Emilia Clarke." Process 800 continues to 806 where control circuitry 404 determines, based the viewer's viewing preferences, aspects of the media asset that is of interest to the viewer. For example, in the case where media asset 104 is "Game of Thrones," control circuitry 404 may determine that strong female lead "Daenerys Targaryen" who is portrayed by the actress "Emilia Clarke" is the aspect of media asset 104 that that is of most interest to the viewer.

Process 800 continues to 808 where control circuitry 404 accesses a data structure associated with the media asset to determine a segment of the media asset to be presented subsequent to the second break. For example, control circuitry 404 may query the a data structure associated with media asset 104 for segments that have time codes within the range defined by the start time code and end time code of media asset segment 110 and select a result retuned by the query. Manners in which control circuitry 404 may perform the query discussed previously are applicable here. Process 800 continues to 810 where control circuitry 404 determines whether the segment of the media asset corresponds to at least one aspect of the aspects of the media asset that is of interest to the viewer. For example, control circuitry 404 may parse the metadata associated with the selected segment to determine if the selected segment is associated with "Daenerys Targaryen."

If, at 810, control circuitry 404 determines that the segment of the media asset corresponds to at least one aspect of the aspects of the media asset that is of interest to the viewer, process 800 continues to 812. At 812, control circuitry 404 includes the segment in a list of potential candidate segments that can be selected as the secondary content related to the media asset. Process 800 continues to 814. If, at 810, control circuitry 404 determines that the segment of the media asset does not correspond to at least one aspect of the aspects of the media asset that is of interest to the viewer, process 800 also continues to 814. At 814, control circuitry 404 determines whether there is there another segment of the media asset to be presented subsequent to the second break. For example, control circuitry 404 may determine whether there is a result returned by the query for segments of media asset segment 110 that was not previously selected. If, at 814, control circuitry 404 determines that there is there another segment of the media asset to be presented subsequent to the second break, process 800 reverts back to 808. At 814, control circuitry 404 determines whether there is another segment of the media asset to be presented subsequent to the second break, process 800 continues to 816.

At 816, control circuitry 404 determines if there is at least one candidate segment included in the list of potential candidate segments. If, at 816, control circuitry 404 determines there is at least one candidate segment included in the list of potential candidate segments, process 800 continues to 818. At 818, control circuitry 404 determines a priority value associated with each candidate segment of the potential candidate segments. For example, upon determining that there are multiple segments related to "Daenerys Targaryen" in the list of potential candidate segments, control circuitry 404 may determine a priority value associated with each of these segments. For example, control circuitry 404 may assign a segment that includes both character "Daenerys Targaryen" and dragons, another viewing preference of the viewer, a higher priority than a segment that includes character "Daenerys Targaryen" only. Process 800 continues to 820 where control circuitry 404 selects candidate segment of the potential candidate segments that has the highest priority as the secondary content related to the media asset. For example, control circuitry 404 may use a variety of sorting functions (e.g., quicksort, heapsort, mergesort or another suitable function) to determine which segment of the multiple segments related to "Daenerys Targaryen" in the list of potential candidate segments has the highest priority. If, at 816, control circuitry 404 determines there is no candidate segment included in the list of potential candidate segments, process 800 continues to 822. At 822, control circuitry 404 selects a default secondary content related to the media asset as the secondary content related to the media asset.

Figure 9:
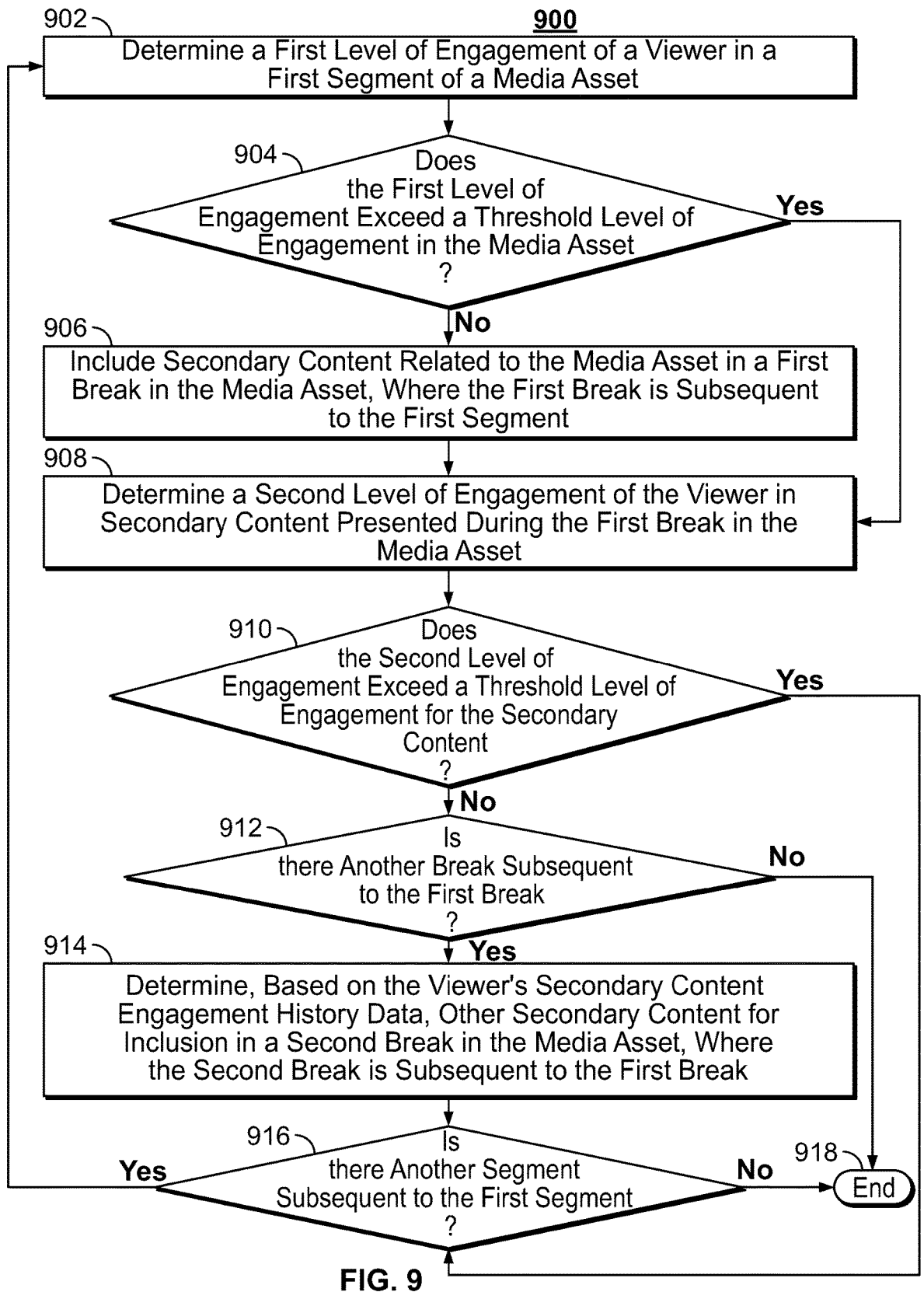
FIG. 9 is a flowchart of illustrative steps involved in determining a type of secondary content for inclusion in a break in a media asset, in accordance with some embodiments of the disclosure.

FIG. 9 is a flowchart of illustrative steps involved in determining a type of secondary content for inclusion in a break in a media asset, in accordance with some embodiments of the disclosure. Process 900 may be used to determine whether a viewer is engaged a media asset and based on this determination, present secondary content related to the media asset during a break in the media asset. Process 900 may be used to determine whether a viewer is engaged secondary content presented during the break and based on this determination, select other secondary content for inclusion in a subsequent break in the media asset. Process 900 may be executed by control circuitry 404 (FIG. 4) as instructed by the media guidance application. Control circuitry 404 may be implemented on user equipment 502, 504, and/or 506 (FIG. 5). In addition, one or more steps of process 900 may be incorporated into or combined with one or more steps of any other process or embodiment.

Process 900 begins at 902 where control circuitry 404 determines a first level of engagement of a viewer in a first segment of a media asset. For example, control circuitry 404 may determine that level of engagement of a viewer in media asset segment 106 of media asset 104 (e.g., Game of Thrones) to be 3. Manners in which control circuitry 404 may perform this determination discussed with respect to FIG. 1 and elsewhere in this application are applicable here. Process 900 continues to 904, where control circuitry 404 determines whether the first level of engagement exceeds a threshold level of engagement in the media asset. Control circuitry 404 may perform this action as discussed with respect to FIG. 1 and elsewhere in this application.

If, at 904, control circuitry 404 determines that the first level of engagement does not exceed the threshold level of engagement in the media asset, process 900 continues to 906. At 906, control circuitry 404 includes secondary content related to the media asset in a first break in the media asset, where the first break is subsequent to the first segment. For example, control circuitry 404 may determine that the level of engagement of a viewer in media asset segment 106 of media asset 104 is less than threshold level of engagement in media asset 104 (e.g., 5). Control circuitry 404 may include a teaser trailer for media asset 104 at a beginning of break 114. Process 900 continues from 906 to 908. For example, the first break may include other secondary content in addition to the secondary content related to the media asset. Information about level of engagement of the viewer in at least some secondary presented during the first break in the media asset may be useful in determining secondary content that is most suited for the viewer.

Process 900 also continues to 908 if, at 904, control circuitry 404 determines that the first level of engagement exceeds the threshold level of engagement in the media asset. At 908, control circuitry 404 determines a second level of engagement of the viewer in secondary content presented during the first break in the media asset. Manners in which control circuitry 404 may perform this determination discussed with respect to FIG. 1 and elsewhere in this application are applicable here. Process 900 continues to 910 where control circuitry 404 determines whether the second level of engagement exceeds a threshold level of engagement for the secondary content. Manners in which control circuitry 404 may perform this determination discussed with respect to FIG. 1 and elsewhere in this application are applicable here.

If, at 910, control circuitry 404 determines that the second level of engagement does not exceed the threshold level of engagement for the secondary content, process 900 continues to 912. At 912, control circuitry 404 determines whether there is another break subsequent to the first break. If, at 912, control circuitry 404 determines that there is another break subsequent to the first break, process 900 continues to 914. For example, control circuitry 404 may determine that there is break 120 that is subsequent to break 114. At 914, control circuitry 404 determines, based on the viewer's secondary content engagement history data, other secondary content for inclusion in a second break in the media asset, where the second break is subsequent to the third segment. For example, control circuitry 404 may determine, based on the viewer's secondary content engagement history data, that the viewer has high engagement scores for beer commercials and low engagement scores for wine commercials. Control circuitry 404 may include beer commercials in break 120. If, at 912, control circuitry 404 determines that there is no other break subsequent to the first break, process 900 continues to 918. At 918, process 900 ends.

Process 900 continues to 916 from 914. Process 900 also continues to 916 if, at 910, control circuitry 404 determines that the second level of engagement exceeds the threshold level of engagement for the secondary content. At 916, control circuitry 404 determines whether there is another segment subsequent to the first segment. If, at 916, control circuitry 404 determines that there is another segment subsequent to the first segment, process 900 reverts back to 902. For example, control circuitry 404 may determine that media asset segment 108 is subsequent to media asset segment 106 and process 900 may revert to 902. As an illustrative example, control circuitry 404 may update the first segment with a pointer to media asset segment 108 and control circuitry 404 may then determine a first level of engagement of the viewer in media asset segment 108. Process 900 then iterates through determining type of secondary content for inclusion in a break in the media asset. If, at 916, control circuitry 404 determines that there is no other segment subsequent to the first segment, process 900 continues to 918. At 918, process 900 ends.

It should be noted that processes 600-900 or any step thereof could be performed on, or provided by, any of the devices shown in FIGS. 4-5. For example, any of processes 600-900 may be executed by control circuitry 404 (FIG. 4) as instructed by the media guidance application implemented on user equipment 502, 504, and/or 506 (FIG. 5). In addition, one or more steps of process 600-900 may be incorporated into or combined with one or more steps of any other process or embodiment.

It is contemplated that the steps or descriptions of FIGS. 6-9 may be used with any other embodiment of this disclosure. In addition, the steps and descriptions described in relation to FIG. 6-9 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selecting a type of secondary content to present to a specific subset of viewers during breaks in media assets, the method comprising:
   determining a first level of engagement of a viewer in a first segment of a media asset;
   determining a second level of engagement of the viewer in secondary content presented during a first break in the media asset, wherein the first break is subsequent to the first segment;
   determining a third level of engagement of the viewer in a second segment of the media asset, wherein the second segment is subsequent to the first break;
   determining whether both the first level of engagement and the third level of engagement exceed a threshold level of engagement in the media asset;
   in response to determining that both the first level of engagement and the third level of engagement exceed the threshold level of engagement in the media asset, determining that the viewer is engaged in the media asset;
   determining whether the second level of engagement exceeds a threshold level of engagement for the secondary content;
   in response to determining that the second level of engagement exceeds the threshold level of engagement for the secondary content, determining that the viewer is engaged in the secondary content;
   in response to determining that the viewer is engaged in the media asset and the viewer is engaged in the secondary content, refraining from generating for display, during a second break in the media asset, a second media asset that comprises content shared with the media asset;
   generating for display, during the second break in the media asset, additional secondary content;
   determining a fourth level of engagement of the viewer in the additional secondary content;
   determining a fifth level of engagement of the viewer in a third segment of the media asset, wherein the third segment is subsequent to the second break;
   determining whether the fifth level of engagement exceeds the threshold level of engagement in the media asset;

in response to determining that the fifth level of engagement exceeds the threshold level of engagement in the media asset, determining that the viewer remains engaged in the media asset;
determining whether the fourth level of engagement exceeds a threshold level of engagement for the additional secondary content;
in response to determining that the fourth level of engagement does not exceed the threshold level of engagement for the additional secondary content, determining that the viewer is not engaged in the additional secondary content; and
in response to determining that the viewer remains engaged in the media asset and the viewer is not engaged in the additional secondary content, generating for display the second media asset that comprises content shared with the media asset during a third break, wherein the third break is subsequent to the third segment.

2. The method of claim 1, wherein the threshold level of engagement for the secondary content is a function of the first level of engagement of the viewer in the first segment of a media asset.

3. The method of claim 1, wherein determining the first level of engagement and the third level of engagement comprises:
accessing a data structure, associated with a profile of the viewer, to determine media consumption behavior of the viewer; and
computing the first level of engagement and the third level of engagement based on the media consumption behavior of the viewer.

4. The method of claim 1, wherein determining the first level of engagement and the third level of engagement comprises:
receiving an average audience engagement level corresponding to an average of levels of engagement of other viewers in the media asset; and
computing the first level of engagement and the third level of engagement based on the average audience engagement level.

5. The method of claim 1, further comprising:
accessing a data structure, associated with a profile of the viewer, to determine indicators of preferences of the viewer;
determining, based on the indicators of preferences of the viewer, an aspect of the media asset that is of most interest to the viewer;
determining a segment of the media asset to be presented subsequent to the second break that corresponds to the aspect of the media asset that is of most interest to the viewer; and
generating for display a second media asset comprising the segment during the second break in the media asset.

6. The method of claim 5, wherein the aspect of the media asset that is of most interest to the viewer is at least one of: a character; a plotline; a setting; and an event.

7. The method of claim 5, further comprising:
including, in the second media asset, an indication that the second media asset will be presented during at least one of the second break or another break in the media asset subsequent to the second break; and
generating for display, during at least one of the second break or another break in the media asset subsequent to the second break, the second media asset.

8. The method of claim 7, wherein the second media asset is not a segment of the media asset, and wherein generating for display the second media asset comprises:
retrieving, from a data structure candidate media assets that share content with the media asset and are not segments of the media asset;
retrieving, from a data structure associated with a profile of the viewer, an indicator of a preference of the viewer;
identifying, from the candidate media assets, the second media asset that is associated with the indicator of the preference of the viewer.

9. The method of claim 1, wherein the threshold level of engagement in the media asset is a first threshold level of engagement in the media asset, further comprising:
retrieving, from a first data structure associated with a profile of the viewer, indicators of preferences of the viewer;
retrieving, from a second data structure containing secondary content, additional secondary content that is associated with at least one of the indicators of preferences of the viewer and a second threshold level of engagement in the media asset; and
generating for display, during the second break in the media asset, the additional secondary content.

10. A system for selecting a type of secondary content to present to a specific subset of viewers during breaks in media assets, the system comprising:
control circuitry configured to:
determine a first level of engagement of a viewer in a first segment of a media asset;
determine a second level of engagement of the viewer in secondary content presented during a first break in the media asset, wherein the first break is subsequent to the first segment;
determine a third level of engagement of the viewer in a second segment of the media asset, wherein the second segment is subsequent to the first break;
determine whether both the first level of engagement and the third level of engagement exceed a threshold level of engagement in the media asset;
in response to determining that both the first level of engagement and the third level of engagement exceed the threshold level of engagement in the media asset, determine that the viewer is engaged in the media asset;
determine whether the second level of engagement exceeds a threshold level of engagement for the secondary content;
in response to determining that the second level of engagement exceeds the threshold level of engagement for the secondary content, determine that the viewer is engaged in the secondary content;
in response to determining that the viewer is engaged in the media asset and the viewer is engaged in the secondary content, refrain from generating for display, during a second break in the media asset, a second media asset that comprises content shared with the media asset;
generate for display, during the second break in the media asset, additional secondary content;
determine a fourth level of engagement of the viewer in the additional secondary content;
determine a fifth level of engagement of the viewer in a third segment of the media asset, wherein the third segment is subsequent to the second break;

determine whether the fifth level of engagement exceeds the threshold level of engagement in the media asset;

in response to determining that the fifth level of engagement exceeds the threshold level of engagement in the media asset, determine that the viewer remains engaged in the media asset;

determine whether the fourth level of engagement exceeds a threshold level of engagement for the additional secondary content;

in response to determining that the fourth level of engagement does not exceed the threshold level of engagement for the additional secondary content, determine that the viewer is not engaged in the additional secondary content; and in response to determining that the viewer remains engaged in the media asset and the viewer is not engaged in the additional secondary content, generate for display the second media asset that comprises content shared with the media asset during a third break, wherein the third break is subsequent to the third segment.

11. The system of claim 10, wherein the threshold level of engagement for the secondary content is a function of the first level of engagement of the viewer in the first segment of a media asset.

12. The system of claim 10, wherein the system further comprises communication circuitry, and wherein the control circuitry is configured, when determining the first level of engagement and the third level of engagement, to:

access, using the communications circuitry, a data structure, associated with a profile of the viewer, to determine media consumption behavior of the viewer; and compute the first level of engagement and the third level of engagement based on the media consumption behavior of the viewer.

13. The system of claim 10, wherein the control circuitry is configured, when determining the first level of engagement and the third level of engagement, to:

receive an average audience engagement level corresponding to an average of levels of engagement of other viewers in the media asset; and compute the first level of engagement and the third level of engagement based on the average audience engagement level.

14. The system of claim 10, wherein the system further comprises communication circuitry, and wherein the control circuitry is further configured to:

access, using the communications circuitry, a data structure, associated with a profile of the viewer, to determine indicators of preferences of the viewer;

determine, based on the indicators of preferences of the viewer, an aspect of the media asset that is of most interest to the viewer;

determine a segment of the media asset to be presented subsequent to the second break that corresponds to the aspect of the media asset that is of most interest to the viewer; and generate for display a second media asset comprising the segment during the second break in the media asset.

15. The system of claim 14, wherein the aspect of the media asset that is of most interest to the viewer is at least one of: a character; a plotline; a setting; and an event.

16. The system of claim 14, wherein the control circuitry is further configured to:

include, in the second media asset, an indication that the second media asset will be presented during at least one of the second break or another break in the media asset subsequent to the second break; and generate for display during at least one of the second break or another break in the media asset subsequent to the second break, the second media asset.

17. The system of claim 16, wherein the second media asset is not a segment of the media asset, and wherein the system further comprises communication circuitry, and wherein the control circuitry is configured, when generating for display the second media asset, to:

retrieve, using the communications circuitry, candidate media assets that share content with the media asset and are not segments of the media asset from a data structure associated with secondary content;

retrieve, using the communications circuitry, an indicator of a preference of the viewer from a data structure associated with a profile of the viewer;

identify, from the candidate media assets, the second media asset that is associated with the indicator of the preference of the viewer.

18. The system of claim 10, wherein the threshold level of engagement in the media asset is a first threshold level of engagement in the media asset, and wherein the system further comprises communication circuitry, and wherein the control circuitry is further configured to:

retrieve, using the communications circuitry, indicators of preferences of the viewer from a first data structure associated with a profile of the viewer;

retrieve, using the communications circuitry, additional secondary content that is associated with at least one of the indicators of preferences of the viewer and a second threshold level of engagement in the media asset from a second data structure containing secondary content; and generate for display during the second break in the media asset, the additional secondary content.

* * * * *